(12) United States Patent
Park et al.

(10) Patent No.: US 12,321,204 B2
(45) Date of Patent: Jun. 3, 2025

(54) ELECTRONIC DEVICE COMPRISING FLEXIBLE DISPLAY AND ANTENNA

(71) Applicant: Samsung Electronics Co., Ltd., Suwon-si (KR)

(72) Inventors: Sungkoo Park, Suwon-si (KR); Kookjoo Lee, Suwon-si (KR); Yongyoun Kim, Suwon-si (KR); Chankyu An, Suwon-si (KR); Soonho Hwang, Suwon-si (KR); Gun Lim, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 18/157,574

(22) Filed: Jan. 20, 2023

(65) Prior Publication Data

US 2023/0152865 A1 May 18, 2023

Related U.S. Application Data

(63) Continuation of application No. PCT/KR2021/009503, filed on Jul. 22, 2021.

(30) Foreign Application Priority Data

Jul. 22, 2020 (KR) .................. 10-2020-0091080

(51) Int. Cl.
*G06F 1/16* (2006.01)
*H01Q 1/24* (2006.01)
(Continued)

(52) U.S. Cl.
CPC .......... *G06F 1/1698* (2013.01); *G06F 1/1652* (2013.01); *H01Q 1/243* (2013.01);
(Continued)

(58) Field of Classification Search
CPC ...... H01Q 13/16; H01Q 1/243; H01Q 1/2291; H04M 1/0268; H04M 1/0269;
(Continued)

(56) References Cited

U.S. PATENT DOCUMENTS 7,904,126 B2    3/2011  Kim et al.
10,312,573 B2 *  6/2019  Kim ..................... H01Q 13/10
(Continued)

FOREIGN PATENT DOCUMENTS

KR    10-2006-0056456 A    5/2006
KR    10-2006-0100156 A    9/2006
(Continued)

OTHER PUBLICATIONS

International Search Report dated Oct. 26, 2021, issued in International Patent Application No. PCT/KR2021/009503.
(Continued)

*Primary Examiner* — Monica C King
(74) *Attorney, Agent, or Firm* — Jefferson IP Law, LLP

(57) ABSTRACT

An electronic device is provided. The electronic device comprises a housing including a first surface facing a first direction, and a second surface facing a second direction opposite to the first surface, a conductive plate disposed at the first surface of the housing to be slidable in a third direction perpendicular to the first direction and including a slot, a flexible display arranged to be supported by the conductive plate and including a first area facing the first surface and a second area extending from the first area and bendable according to the sliding of the conductive plate, and a wireless communication circuit configured to transmit and/or receive a signal in a selected or designated frequency band through an antenna formed on the basis of at least a part of the conductive plate, which surrounds the slot.

11 Claims, 23 Drawing Sheets

(51) Int. Cl.
*H01Q 3/10* (2006.01)
*H01Q 13/10* (2006.01)
*H01Q 21/28* (2006.01)
*H04M 1/02* (2006.01)

(52) U.S. Cl.
CPC ............... *H01Q 3/10* (2013.01); *H01Q 13/10* (2013.01); *H01Q 21/28* (2013.01); *H04M 1/0216* (2013.01)

(58) Field of Classification Search
CPC ............. H04M 1/0214; H04M 1/0266; H04M 1/0237; H04M 1/0216; H04M 2201/38; G06F 1/1652; G06F 1/1622; G09F 9/301
See application file for complete search history.

(56) References Cited

U.S. PATENT DOCUMENTS

| | | | |
|---|---|---|---|
| 10,700,415 B2* | 6/2020 | Shin | G06F 1/1698 |
| 10,827,046 B1 | 11/2020 | Li et al. | |
| 10,972,592 B2* | 4/2021 | Song | H04M 1/0237 |
| 11,031,701 B2 | 6/2021 | Li et al. | |
| 11,693,452 B2* | 7/2023 | Kwak | G06F 1/1624 |
| | | | 361/679.01 |
| 11,815,948 B2* | 11/2023 | Song | G06F 1/1652 |
| 11,815,959 B2* | 11/2023 | Kim | G06F 1/1624 |
| 11,967,753 B2* | 4/2024 | Kim | H01Q 5/378 |
| 12,034,202 B2* | 7/2024 | Jeon | H01Q 1/22 |
| 2017/0142241 A1* | 5/2017 | Kim | H04M 1/0218 |
| 2017/0250460 A1 | 8/2017 | Shin et al. | |
| 2019/0250669 A1* | 8/2019 | Liao | G04G 17/045 |
| 2019/0261519 A1 | 8/2019 | Park et al. | |
| 2019/0288392 A1 | 9/2019 | Kim et al. | |
| 2019/0317550 A1 | 10/2019 | Kim et al. | |
| 2020/0020255 A1 | 1/2020 | Yoon | |
| 2020/0076065 A1 | 3/2020 | Zhou | |
| 2020/0264660 A1* | 8/2020 | Song | G06F 1/1624 |
| 2020/0267246 A1* | 8/2020 | Song | H05K 1/148 |
| 2020/0267247 A1* | 8/2020 | Song | H04M 1/0237 |
| 2020/0371558 A1 | 11/2020 | Kim et al. | |
| 2021/0120111 A1* | 4/2021 | Choi | G06F 1/1624 |
| 2021/0135492 A1 | 5/2021 | Kim et al. | |
| 2021/0219437 A1 | 7/2021 | Kim et al. | |
| 2021/0359392 A1* | 11/2021 | Won | H01Q 5/307 |
| 2022/0100236 A1* | 3/2022 | Kwak | H04M 1/0268 |
| 2022/0116077 A1 | 4/2022 | Kim et al. | |
| 2022/0271787 A1* | 8/2022 | Moon | H04M 1/0264 |
| 2022/0326737 A1* | 10/2022 | Ran | G06F 1/1652 |
| 2022/0398008 A1* | 12/2022 | Li | G06F 3/165 |
| 2023/0036424 A1* | 2/2023 | Kim | G06F 1/1616 |
| 2023/0038719 A1* | 2/2023 | Hyun | G06F 1/1681 |
| 2023/0042280 A1* | 2/2023 | Kim | B32B 27/308 |
| 2023/0047246 A1* | 2/2023 | An | H05K 9/00 |
| 2023/0089687 A1* | 3/2023 | Kwon | H01Q 1/38 |
| | | | 343/702 |
| 2023/0099802 A1* | 3/2023 | An | H04M 1/0237 |
| | | | 455/566 |
| 2023/0109587 A1* | 4/2023 | Lee | H01Q 1/38 |
| | | | 343/702 |
| 2023/0152865 A1* | 5/2023 | Park | H01Q 9/30 |
| | | | 361/679.27 |
| 2023/0171932 A1* | 6/2023 | Yoon | G06F 1/1656 |
| | | | 361/679.01 |
| 2023/0198131 A1* | 6/2023 | Lee | H01Q 1/38 |
| | | | 343/702 |
| 2023/0352814 A1* | 11/2023 | An | H04M 1/0237 |
| 2023/0363082 A1* | 11/2023 | Kim | G06F 1/1616 |
| 2023/0389243 A1* | 11/2023 | Cho | H05K 7/20963 |
| 2023/0413443 A1* | 12/2023 | Seong | H05K 1/147 |
| 2024/0031461 A1* | 1/2024 | Kim | H04M 1/022 |
| 2024/0063528 A1* | 2/2024 | Seol | H04M 1/0237 |
| 2024/0072416 A1* | 2/2024 | Hwang | H01Q 1/526 |
| 2024/0073307 A1* | 2/2024 | Bae | H05K 1/189 |
| 2024/0106103 A1* | 3/2024 | Kim | H01Q 21/28 |
| 2024/0267444 A1* | 8/2024 | Kim | H04B 1/44 |
| 2024/0267447 A1* | 8/2024 | Burke | H01Q 1/243 |

FOREIGN PATENT DOCUMENTS

| | | |
|---|---|---|
| KR | 10-2006-0128113 A | 12/2006 |
| KR | 10-0683868 B1 | 2/2007 |
| KR | 10-2017-0100972 A | 9/2017 |
| KR | 10-2018-0050820 A | 5/2018 |
| KR | 10-2019-0012813 A | 2/2019 |
| KR | 10-2019-0071797 A | 6/2019 |
| KR | 10-2019-0086305 A | 7/2019 |
| KR | 10-2019-0115888 A | 10/2019 |
| KR | 10-2019-0143029 A | 12/2019 |
| KR | 10-2021-0125346 A | 10/2021 |

OTHER PUBLICATIONS

Extended European Search Report dated Nov. 24, 2023, issued in European Application No. 21846812.2-1224.
Korean Office Action dated Oct. 8, 2024, issued in Korean Patent Application No. 10 2020 0091080.

* cited by examiner

——————— : 1801

— — — — — : 1802

ELECTRONIC DEVICE COMPRISING FLEXIBLE DISPLAY AND ANTENNA

CROSS-REFERENCE TO RELATED APPLICATION(S)

This application is a continuation application, claiming priority under § 365(c), of an International application No. PCT/KR2021/009503, filed on Jul. 22, 2021, which is based on and claims the benefit of a Korean patent application number 10-2020-0091080, filed on Jul. 22, 2020, in the Korean Intellectual Property Office, the disclosure of which is incorporated by reference herein in its entirety.

BACKGROUND

1. Field

The disclosure relates to an electronic device including a flexible display and an antenna.

2. Description of Related Art

An electronic device may include a metal exterior member, and the metal exterior member not only provides a high-grade design having unique metal characteristics but also improve durability. As the types of applications, which may be used in electronic devices such as smartphones, are diversified, the number of antennas included in the electronic device is consistently increasing. The electronic device may use the metal exterior member as an antenna.

The above information is presented as background information only to assist with an understanding of the disclosure. No determination has been made, and no assertion is made, as to whether any of the above might be applicable as prior art with regard to the disclosure.

SUMMARY

With the development of digital technologies, electronic devices are provided in various forms such as smartphones, tablet personal computers (tablet PCs), or personal digital assistants (PDAs). The electronic device tends to be designed to provide a larger screen while having a size that allows a user to carry the electronic device with his/her hand without causing any inconvenience to the user. For example, the electronic device may be implemented such that the screen may be expanded in a sliding manner. The electronic device may include a flexible display, and a part of the flexible display may be extended from an internal space of the electronic device, such that the screen may be expanded. However, the structure for implementing the sliding operation may make it difficult to dispose or add the antenna while ensuring antenna radiation performance.

Aspects of the disclosure are to address at least the above-mentioned problems and/or disadvantages and to provide at least the advantages described below. Accordingly, an aspect of the disclosure is to provide an electronic device including a structure for implementing a sliding operation, a flexible display, and a plurality of antennas.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first surface directed in a first direction, and a second surface directed in a second direction opposite to the first surface, a conductive plate disposed on the first surface of the housing so as to be slidable in a third direction perpendicular to the first direction, the conductive plate including a slot, a flexible display disposed to be supported by the conductive plate, the flexible display including a first area facing the first surface, and a second area extending from the first area and configured to be bendable in accordance with a sliding motion of the conductive plate, and a wireless communication circuit configured to transmit and/or receive a signal in a selected or designated frequency band through an antenna formed based on at least a part of the conductive plate that surrounds the slot.

According to various embodiments of the disclosure, it is possible to provide the antenna capable of ensuring the antenna radiation performance while overcoming the constraint of the antenna design caused by the structure for the sliding motion in the electronic device including the flexible display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
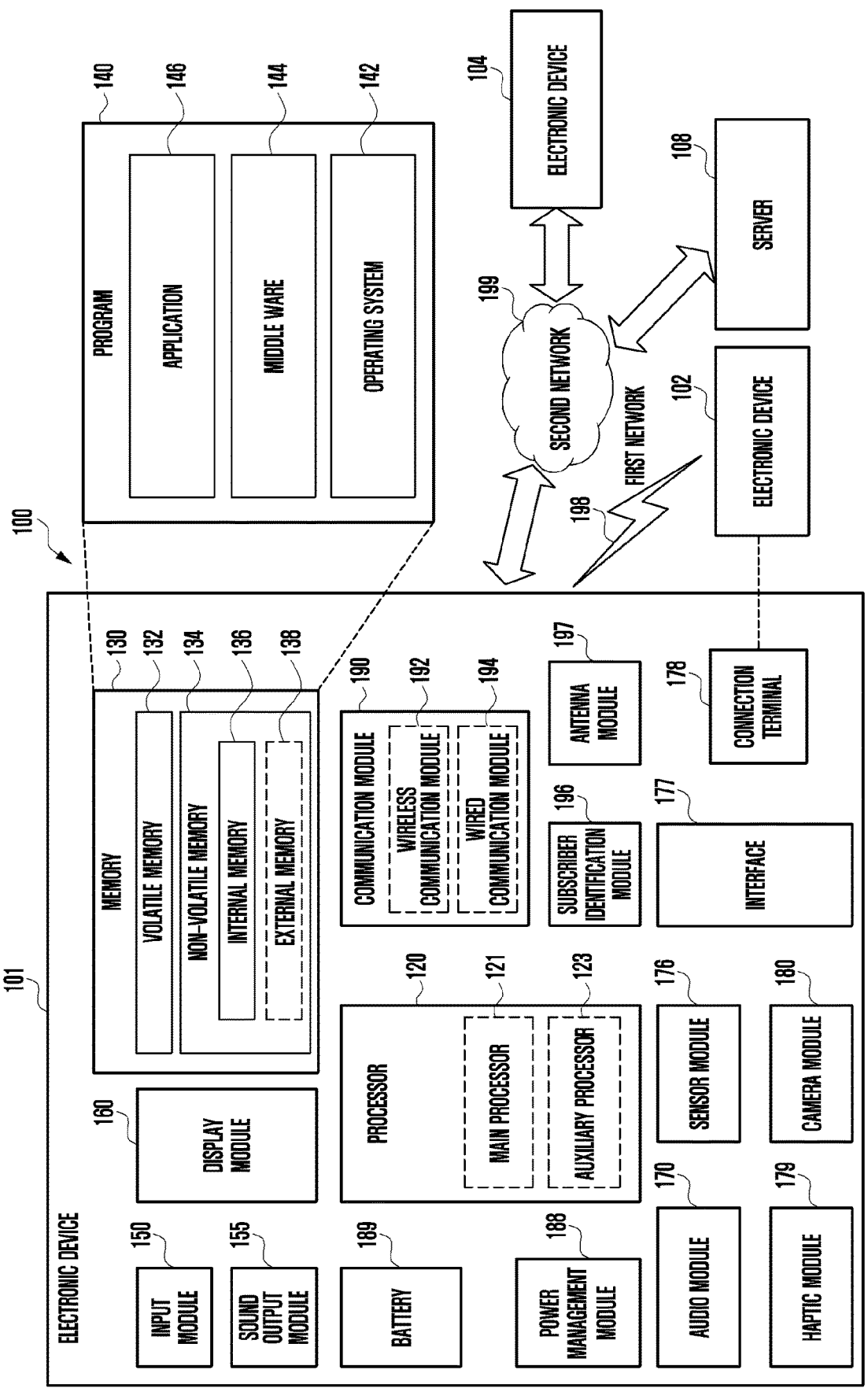
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the displays, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., electronic device 102, electronic device 104, or server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply delineates that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
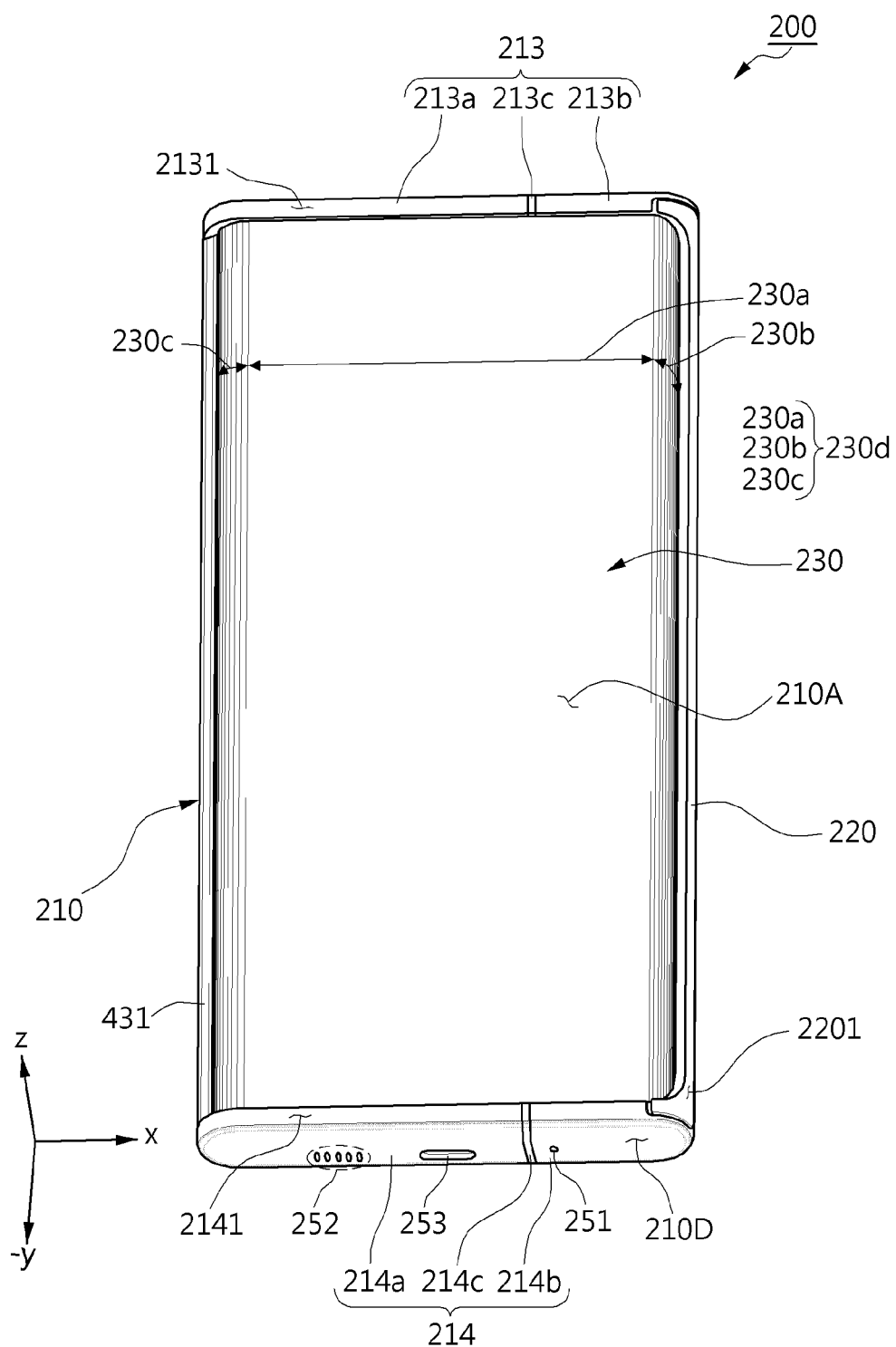
FIG. 2A is a front perspective view related to an electronic device in a closed state according to an embodiment of the disclosure.
Figure 2B:
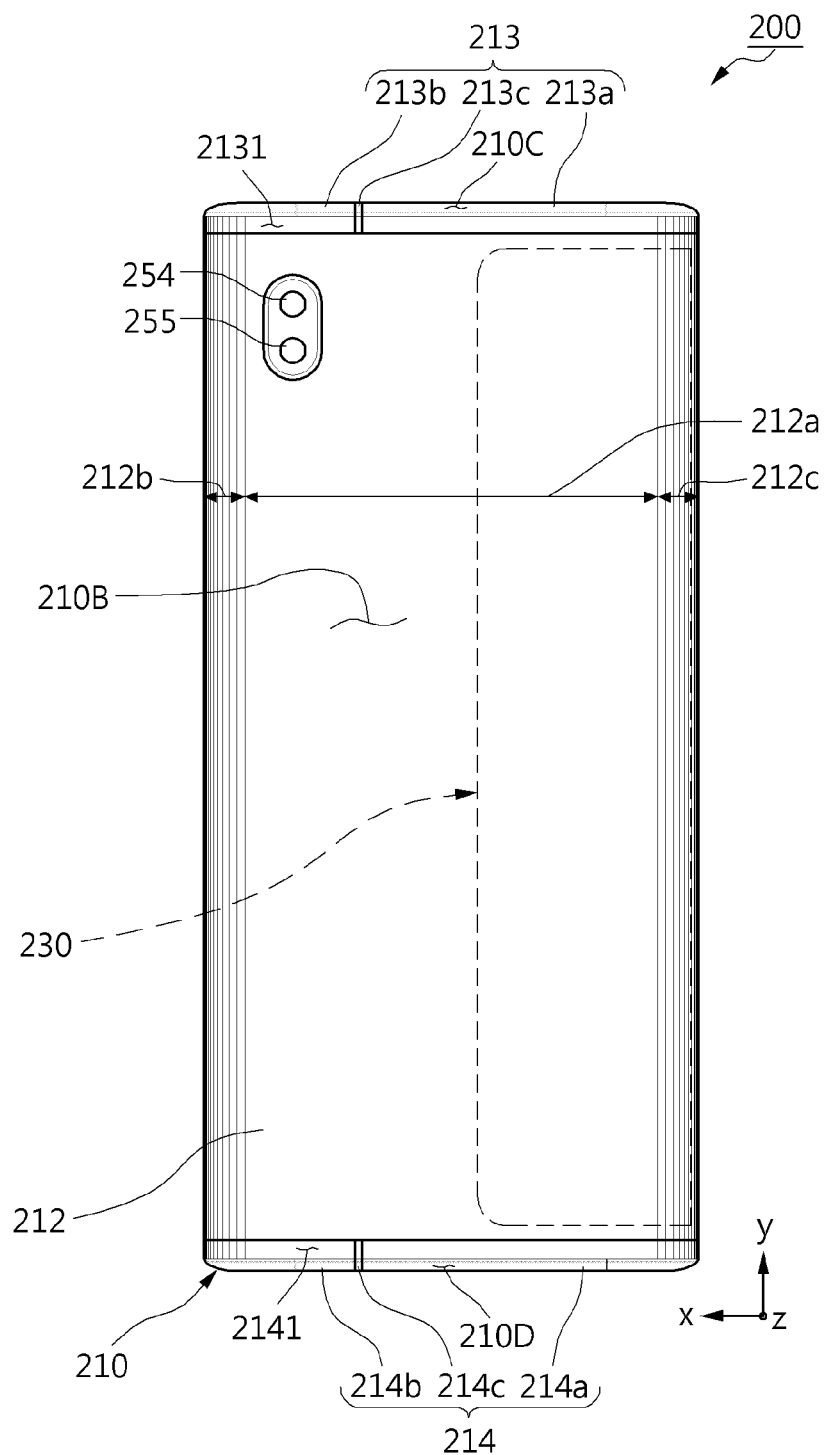
FIG. 2B is a rear perspective view related to an electronic device in a closed state according to an embodiment of the disclosure.
Figure 3A:
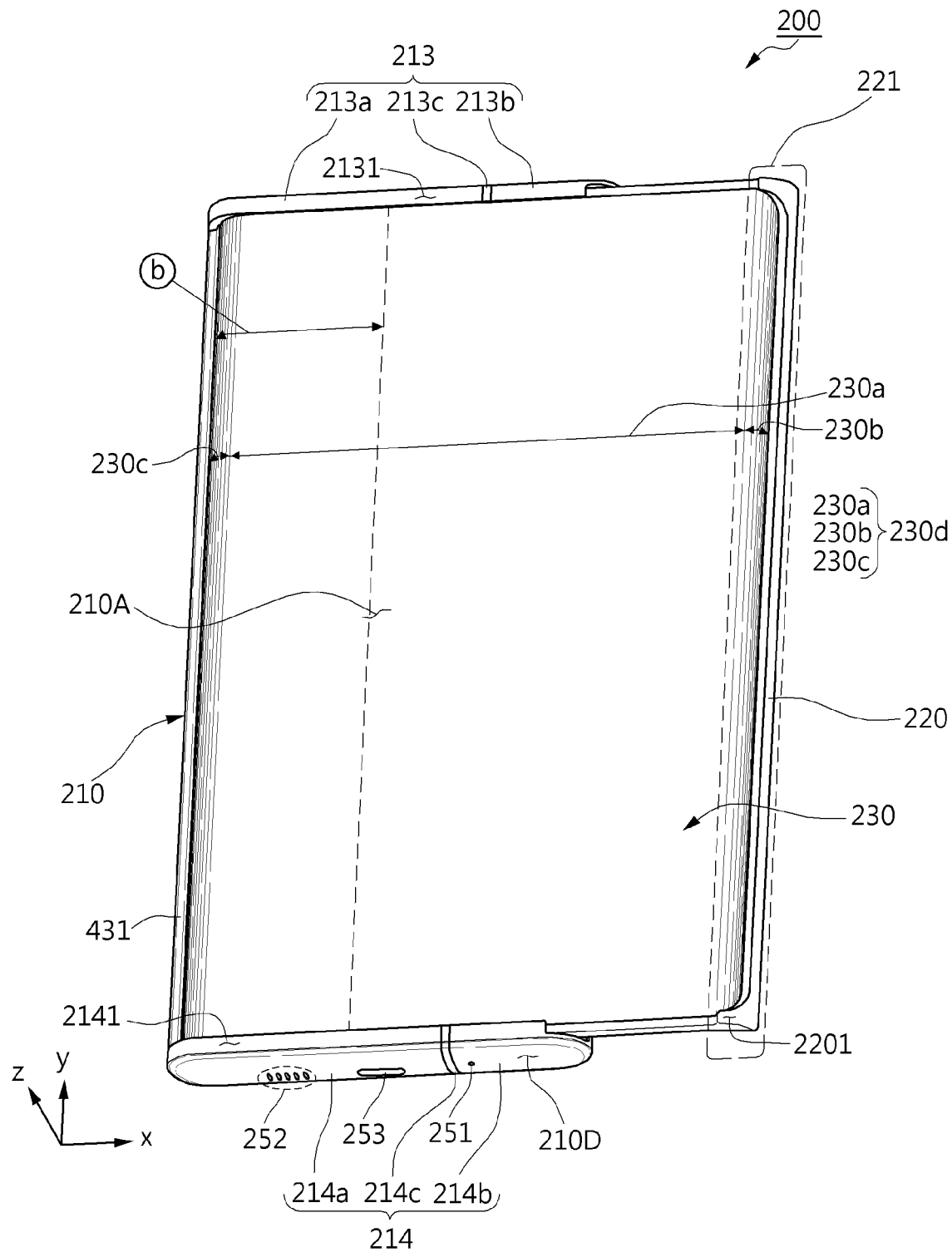
FIG. 3A is a front perspective view related to an electronic device in an open state according to an embodiment of the disclosure.
Figure 3B:
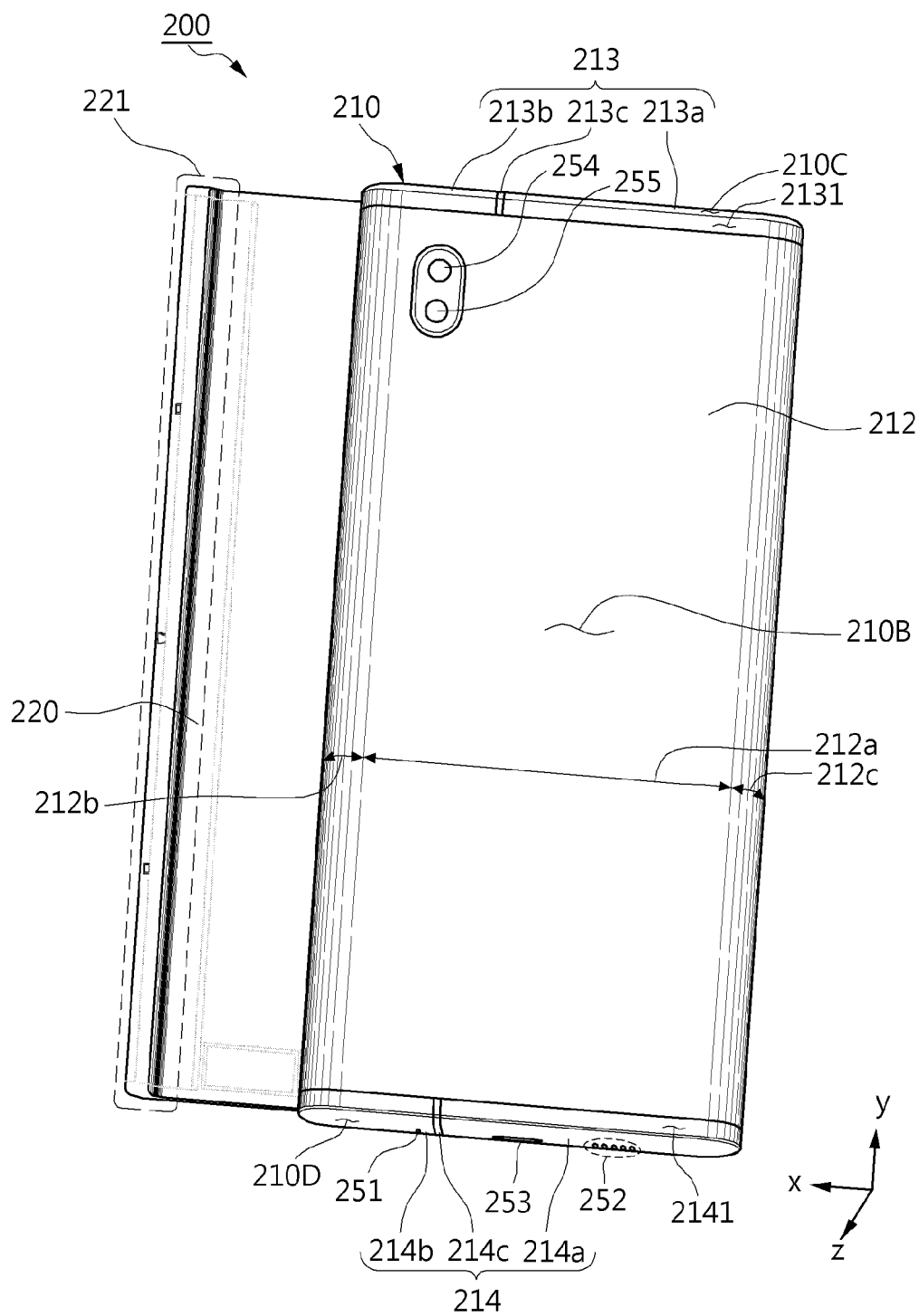
FIG. 3B is a rear perspective view related to an electronic device in an open state according to an embodiment of the disclosure.

FIG. 2A is a front perspective view related to an electronic device in a closed state according to an embodiment of the disclosure. FIG. 2B is a rear perspective view related to an electronic device in a closed state according to an embodiment of the disclosure. FIG. 3A is a front perspective view related to an electronic device in an open state according to an embodiment of the disclosure. FIG. 3B is a rear perspective view related to an electronic device in an open state according to an embodiment of the disclosure.

Referring to FIGS. 2A, 2B, 3A, and 3B, in the embodiment, an electronic device 200 may be implemented to expand a screen in a sliding manner. For example, a screen 230d may be an area of a flexible display 230 that is visible to the outside. FIGS. 2A and 2B illustrate the electronic device 200 in which the screen 230d is not expanded, and FIGS. 3A and 3B illustrate the electronic device 200 in which the screen 230d is expanded. The state in which the screen 230d is not expanded may be referred to as a 'closed state' in which a display support structure 220 for allowing a sliding motion of the flexible display 230 does not slide out. For example, the sliding-out may mean that the display support structure 220 at least partially moves in a first direction (e.g., a +x-axis direction) when the electronic device 200 is in the closed state. The state in which the screen 230d is expanded may be referred to as an 'open state' in which the screen 230d is maximally expanded and the screen 230d is not expanded any further by the sliding-out of the display support structure 220. According to various embodiments, the open state may be defined as a state in which the screen 230d is expanded in comparison with the closed state. The open state may provide screens various sizes in accordance with a movement position of the display support structure 220. According to various embodiments, an intermediate state may refer to a state between the closed state in FIG. 2A and the open state in FIG. 3A. The screen 230d is an active area of the flexible display 230 that is visually exposed and may output images. The electronic device 200 may adjust the active area in accordance with a movement of the display support structure 220 or a movement of the flexible display 230. In the following description, the open state may refer to the state in which the screen 230d is maximally expanded. In any embodiment, the flexible display 230, which is slidably disposed on the electronic device 200 in FIG. 2A and provides the screen 230d, may be referred to as a 'slide-out display' or an 'expandable display'. According to various embodiments, the electronic device 200 including the flexible display 230 may include the electronic device 101 in FIG. 1.

According to the embodiment, the electronic device 200 may include a sliding structure related to the flexible display 230. For example, when the flexible display 230 is moved to a preset distance by an external force, an elastic structure included in the sliding structure may switch the state from the closed state to the open state or from the open state to the closed state without an additional external force.

According to any embodiment, when an input device included in the electronic device 200 generates a signal, a drive device, such as a motor, connected to the flexible display 230 may switch the state of the electronic device 200 from the closed state to the open state or from the open state to the closed state. For example, when a signal is generated by a hardware button or a software button provided through the screen, the electronic device 200 may switch from the closed state to the open state or from the open state to the closed state.

According to various embodiments, when a signal is generated from various sensors such as a pressure sensor, the electronic device 200 may switch from the closed state to the open state or from the open state to the closed state. For example, a sensor may detect a squeeze gesture when a part of a user's hand (e.g., palm or finger) presses a designated section of the electronic device 200 when the user carries or grips the electronic device 200, and the electronic device 200 switches from the closed state to the open state or from the open state to the closed state in response to the squeeze gesture.

According to the embodiment, the flexible display 230 may include a second area ⓑ (see FIG. 3A). The second area ⓑ may include a portion of the screen 230*d* that is expanded when the electronic device 200 switches from the closed state to the open state. When the electronic device 200 switches from the closed state to the open state, at least a part of the second area ⓑ may be extended from the internal space of the electronic device 200, such that the screen 230*d* may be expanded. When the electronic device 200 switches from the open state to the closed state, at least a part of the second area ⓑ may be retracted into the internal space of the electronic device 200, such that the screen 230*d* may be contracted. When the electronic device 200 switches from the open state to the closed state, at least a part of the second area ⓑ may move to the internal space of the electronic device 200 while being curved. For example, the flexible display 230 may include a substrate (e.g., plastic substrate) made of a polymer material containing polyimide (PI) or polyester (PET). In various embodiments, the second area ⓑ is a portion that is curved from the flexible display 230 when the electronic device 200 switches between the open state and the closed state. For example, the second area may be referred to as a bendable section.

According to the embodiment, the electronic device 200 may include a housing 210, the display support structure 220, or the flexible display 230.

For example, the housing (or a casing) 210 may include a back cover 212, a first side cover (or a first side cap) 213, or a second side cover (or a second side cap) 214. The back cover 212, the first side cover 213, or the second side cover 214 may be connected to a support member (not illustrated) positioned in the electronic device 200 and define at least a part of an external appearance of the electronic device 200.

For example, the back cover 212 may define at least a part of a rear surface 210B of the electronic device 200. In the embodiment, the back cover 212 may be substantially opaque. For example, the back cover 212 may be formed by coated or colored glass, ceramic, polymer, metal (e.g., aluminum, stainless steel (STS), or magnesium), or a combination of at least two of the above-mentioned materials. According to the embodiment, the back cover 212 may include a planar portion 212*a*, and curved surfaces 212*b* and 212*c* positioned to be opposite to each other with the planar portion 212*a* interposed therebetween. The curved surfaces 212*b* and 212*c* may be formed adjacent to two relatively long opposite edges (not illustrated) of the back cover 212 and curved toward the screen 230*d* positioned opposite to the back cover 212. The curved surfaces 212*b* and 212*c* may extend in a seamless manner. According to any embodiment, the back cover 212 may include one of the curved surfaces 212*b* and 212*c* or be implemented without the curved surfaces 212*b* and 212*c*. In any embodiment, at least a part of the second area ⓑ may also be disposed to be visible from the outside through the back cover 212 in the state (e.g., the closed state) in which the second area ⓑ of the flexible display 230 is retracted into the internal space of the housing 210. In this case, the back cover 212 may be made of a transparent material and/or a semi-transparent material.

According to the embodiment, the first side cover 213 and the second side cover 214 may be positioned opposite to each other. For example, the first side cover 213 and the second side cover 214 may be positioned opposite to each other with the flexible display 230 interposed therebetween in a second direction (e.g., y-axis direction) orthogonal to the first direction (e.g., the x-axis direction) of slide-out of the display support structure 220. The first side cover 213 may define at least a part of a first side surface 210C of the electronic device 200. The second side cover 214 may define at least a part of a second side surface 210D of the electronic device 200 that is directed in a direction opposite to the first side surface 210C. The first side cover 213 may include a first rim portion (or, a first rim) 2131 extending from an edge of the first side surface 210C. For example, the first rim portion 2131 may define at least a part of one side bezel of the electronic device 200. The second side cover 214 may include a second rim portion (or a second rim) 2141 extending from an edge of the second side surface 210D. For example, the second rim portion 2141 may define at least a part of the other side bezel of the electronic device 200.

According to the embodiment, the display support structure 220 may perform a sliding motion on the support member (not illustrated) positioned in the electronic device 200. At least a part of the flexible display 230 may be disposed on the display support structure 220. The closed state in FIG. 2A or the open state in FIG. 3A may be implemented based on a position of the display support structure 220 on the support member. According to the embodiment, the flexible display 230 may be attached to the display support structure 220 based on a bonding member (or an adhesive member) (not illustrated) such as a double-sided tape. According to various embodiments, the bonding member may include a thermally reactive bonding agent or a photo reactive bonding agent. According to various embodiments, at least a part of the flexible display 230 may be inserted into a recess (not illustrated) formed in the display support structure 220 and disposed and fixed onto the display support structure 220. The display support structure 220 may serve to support at least a part of the flexible display 230. According to any embodiment, the display support structure 220 may be referred to as a sliding plate or a slidable support plate.

According to the embodiment, the display support structure 220 may include a third rim portion 2201 that defines an outer surface of the electronic device 200 (e.g., a surface that is exposed to the outside and defines an external appearance of the electronic device 200). For example, the third rim portion 2201, together with the first and second rim portions 2131 and 2141, defines a bezel at the periphery of the screen 230*d* in the closed state in FIG. 2A. In the closed state, the third rim portion 2201 may be extended in the second direction (e.g., the y-axis direction) to connect one end of the first side cover 213 and one end of the second side cover 214. For example, in the closed state in FIG. 2A, a surface (not illustrated) of the third rim portion 2201 may be smoothly connected to a surface (not illustrated) of the first rim portion 2131 and a surface of the second rim portion 2141. According to various embodiments, the third rim portion 2201 of the display support structure 220 is an element that defines a part of an outer surface of the electronic device 200, and the third rim portion 2201 may be defined as a part of the housing 210.

When the display support structure 220 slides out, at least a part of the second area ⓑ may come out of the electronic device 200, such that the state (e.g., the open state) in which the screen 230d is expanded may be provided, as illustrated in FIG. 3A.

According to the embodiment, in the closed state in FIG. 2A, the screen 230d may include a planar portion 230a, and a first curved portion 230b and/or a second curved portion 230c positioned opposite to each other with the planar portion 230a interposed therebetween. For example, in the closed state in FIG. 2A, the first curved portion 230b and/or the second curved portion 230c may be positioned to correspond to the curved surfaces 212b and 212c of the back cover 212 and curved toward the back cover 212. In the embodiment, the first curved portion 230b and/or the second curved portion 230c may be eliminated. When the state is changed from the closed state in FIG. 2A to the open state in FIG. 3A, the planar portion 230a may be expanded. For example, a part of the second area ⓑ, which defines the second curved portion 230c in the closed state in FIG. 2A, may be formed as another part of the second area ⓑ and included in the planar portion 230a that is expanded when the state is changed from the closed state in FIG. 2A to the open state in FIG. 3A.

According to the embodiment, the electronic device 200 may include an opening (not illustrated) through which the second area ⓑ is retracted or extended, and/or a pulley (not illustrated) positioned in the opening. The pulley may be positioned to correspond to the second area ⓑ, and the pulley may rotate when the electronic device switches between the closed state in FIG. 2A and the open state in FIG. 3A. The first curved portion 230b may be formed to correspond to a curved surface formed on one surface of the display support structure 220. In the embodiment, the second curved portion 230c may be defined by a portion of the second area ⓑ that corresponds to a curved surface of the pulley. The first curved portion 230b may be positioned opposite to the second curved portion 230c in the closed state or the open state of the electronic device 200 and improve an aesthetic appearance of the screen 230d. According to any embodiment, the planar portion 230a may be disposed to be expanded while substituting for the first curved portion 230b.

According to the embodiment, the flexible display 230 may further include a touch detection circuit (e.g., a touch sensor). According to various embodiments (not illustrated), the flexible display 230 may be coupled to or disposed adjacent to a pressure sensor configured to measure intensity (pressure) of touch and/or a digitizer configured to detect a stylus pen that operates in a magnetic field manner.

According to the embodiment, the electronic device 200 may include a microphone hole 251 (e.g., the input module 150 in FIG. 1), a speaker hole 252 (e.g., the sound output module 155 in FIG. 1), a connector hole 253 (e.g., the connection terminal 178 in FIG. 1), a camera module 254 (e.g., the camera module 180 in FIG. 1), or a flash 255. According to various embodiments, the flash 255 may be included in the camera module 254. In any embodiment, the electronic device 200 may exclude at least one of the constituent elements or further include other constituent elements.

For example, the microphone hole 251 may be formed in the second side surface 210D and correspond to a microphone (not illustrated) positioned in the electronic device 200. A position of the microphone hole 251 may be variously configured without being limited to the embodiment in FIG. 2A. According to any embodiment, the electronic device 200 may include a plurality of microphones capable of detecting a direction of sound.

For example, the speaker hole 252 may be formed in the second side surface 210D and correspond to a speaker positioned in the electronic device 200. A position of the speaker hole 252 may be variously configured without being limited to the embodiment in FIG. 2A. According to various embodiments, the electronic device 200 may include a telephone receiver hole. In any embodiment, the microphone hole 251 and the speaker hole 252 may be implemented as a single hole. Alternatively, the speaker hole 252 may be eliminated like a piezoelectric speaker.

For example, the connector hole 253 may be formed in the second side surface 210D and corresponds to a connector (e.g., a USB connector) positioned in the electronic device 200. The electronic device 200 may transmit and/or receive electric power and/or data to and/or an external electronic device electrically to the connector through the connector hole 253. A position of the connector hole 253 may be variously configured without being limited to the embodiment in FIG. 2A.

For example, the camera module 254 and the flash 255 may be positioned on the rear surface 210B of the electronic device 200. The camera module 254 may include one lens or a plurality of lenses, an image sensor, and/or an image processor. For example, the flash 255 may include a light-emitting diode or a xenon lamp. In various embodiments, the electronic device 200 may include a plurality of camera modules without being limited to the embodiment in FIG. 2B or 3B. The camera module 254 may be one of the plurality of camera modules. For example, the electronic device 200 may include a plurality of camera modules (e.g., a dual camera or a triple camera) having different attributes (e.g., angles of view) or different functions. For example, the electronic device may include a plurality of camera modules (e.g., the camera module 254) including lenses having different angles of view. The electronic device 200 may perform control to change the camera module that operates in the electronic device 200 based on the user's selection. As another example, the plurality of camera modules may include at least one of a wide-angle camera, a telephoto camera, a color camera, a monochrome camera, and an infrared (IR) camera (e.g., a time of flight (TOF) camera or a structured light camera). According to the embodiment, the IR camera may operate as at least a part of the sensor module (not illustrated) (e.g., the sensor module 176 in FIG. 1).

According to various embodiments (not illustrated), the electronic device 200 may further include a camera module (e.g., a front camera) configured to produce an image signal based on light received through one surface (e.g., front surface 210A) of the electronic device 200 placed in a direction toward the screen 230d. For example, the camera module 254 is not limited to the embodiment in FIG. 2B or 3B. The camera module 254 may be aligned with an opening (e.g., a through-hole or a notch) formed in the flexible display 230, and the camera module 254 may be positioned in the housing 210. The camera module 254 may produce an image signal by receiving light through the opening and a partial area of a transparent cover that overlaps the opening. For example, the transparent cover may be made of a material such as polyimide or ultra-thin glass (UTG) and protect the flexible display 230 from the outside.

According to various embodiments, the camera module 254 may be disposed at a lower end of at least a part of the screen 230d of the flexible display 230 without being limited to the embodiment in FIG. 2B or 3B. In this case, it is possible to perform relevant functions (e.g., image capturing) by using the camera module 254 without visually distinguishing (or exposing) the position of the camera module 254. For example, the camera module 254 is disposed to overlap at least a part of the screen 230d when viewed from above the screen 230d (e.g., when viewed in a −z-axis direction), such that the camera module 254 may acquire an image of an external subject without being exposed to the outside.

According to various embodiments (not illustrated), the electronic device 200 may further include a key input device (e.g., the input module 150 in FIG. 1) (not illustrated). For example, the key input device may be positioned on the first side surface 210C of the electronic device 200 defined by the first side cover 213. In any embodiment (not illustrated), the key input device may include at least one sensor module.

According to various embodiments (not illustrated), the electronic device 200 may include various sensor modules (e.g., the sensor module 176 in FIG. 1). The sensor module may generate electrical signals or data values corresponding to an internal operating state of the electronic device 200 or an external environment state. As an example (not illustrated), the sensor module may include a proximity sensor configured to generate a signal related to an approach of an external object based on light received through the front surface 210A of the electronic device 200 placed in the direction toward the screen 230d. As another example (not illustrated), the sensor module may include various biosensors such as a fingerprint sensor or an HRM sensor that detects information on a living body based on light received through the front surface 210A or the rear surface 210B of the electronic device 200. The electronic device 200 may include at least one of various other sensor modules, e.g., a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, and an illuminance sensor.

According to various embodiments (not illustrated), the disclosure is not limited to the embodiments in FIGS. 2A, 2B, 3A, and 3C, and the electronic device 200 may have a structure in which the screen is expanded from the third rim portion 2201 when the display support structure 220 slides out. For example, a partial area of the flexible display 230, which defines the first curved portion 230b in the closed state in FIG. 2A, may be formed as another area of the flexible display 230 and included in the planar portion 230a that is expanded when the state is changed from the closed state in FIG. 2A to the open state in FIG. 3A.

According to the embodiment, the first side cover 213 may include two first conductors 213a and 213b or a first insulator 213c. The first insulator 213c may be disposed between the first conductors 213a and 213b and define the first side surface 210C together with the first conductors 213a and 213b. The first conductors 213a and 213b may be coupled to the first insulator 213c and kept physically separated from each other. According to the embodiment, at least some of the first conductors 213a and 213b of the first side cover 213 may be used as an antenna radiator. According to various embodiments, the number, position, or shape of the first conductor included in the first side cover 213 or the number, position, or shape of the insulator between the first conductors may be variously configured without being limited to the embodiment in FIG. 2A, 2B, 3A, or 3B.

According to the embodiment, the second side cover 214 may include two second conductors 214a and 214b or a second insulator 214c. The second insulator 214c may be disposed between the second conductors 214a and 214b and define the second side surface 210D together with the second conductors 214a and 214b. The second conductors 214a and 214b may be coupled to the second insulator 214c and kept physically separated from each other. According to the embodiment, at least some of the second conductors 214a and 214b of the second side cover 214 may be used as an antenna radiator. According to various embodiments, the number, position, or shape of the second conductor included in the second side cover 214 or the number, position, or shape of the insulator between the second conductors may be variously configured without being limited to the embodiment in FIG. 2A, 2B, 3A, or 3B.

According to the embodiment, at least a part of the display support structure 220 may include an electrically conductive material and be used as an antenna radiator. For example, a part 221 (see FIG. 3A or 3B) of the display support structure 220, which defines the third rim portion 2201, may be used as at least one antenna radiator. The at least one antenna radiator, which is implemented by using the part 221 of the display support structure 220 including the third rim portion 2201, may overcome a constraint on antenna design caused by the structure for implementing the sliding operation. At least one antenna radiator, which is implemented by using the part 221 of the display support structure 220 including the third rim portion 2201, is positioned at an outer periphery of the electronic device 200, together with the first side cover 213 and the second side cover 214, in the open state in FIG. 3A as well as the closed state in FIG. 2A, and this may be advantageous in ensuring the antenna radiation performance.

According to the embodiment, a part of a support member 431 (e.g., third support member 430 in FIG. 4) at least partially positioned in the housing 210 may be positioned in the vicinity of the opening through which the second area is retracted ⓑ or extended. For example, a part of the support member 431 may be positioned opposite to the third rim portion 2201 when viewed in the z-axis direction. According to various embodiments, at least a part of the support member 431 may be used as an antenna radiator. As another example, at least a part of the support member 431 may define at least a part of the side surface of the housing 210.

Figure 4:
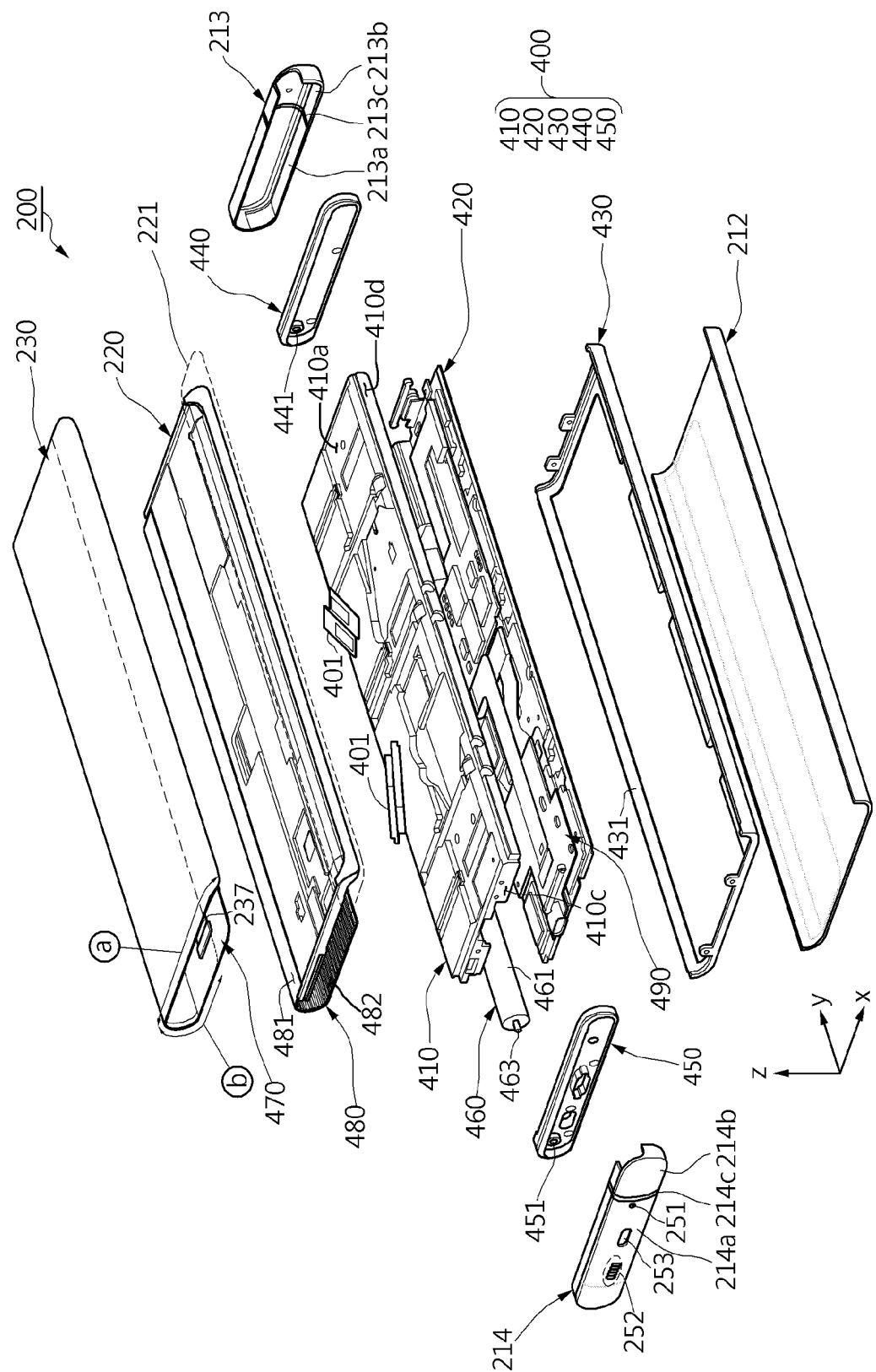
FIG. 4 is a deployed perspective view related to an electronic device according to an embodiment of the disclosure.

FIG. 4 is a deployed perspective view related to an electronic device according to an embodiment of the disclosure.

Referring to FIG. 4, in the embodiment, an electronic device 200 may include the back cover 212, the first side cover 213, the second side cover 214, a support member assembly 400, a pulley 460, the display support structure (e.g., the sliding plate) 220, the flexible display 230, a support sheet 470, a multi-bar structure (or a multi-bar assembly) 480, or a printed circuit board 490 (e.g., a printed circuit board (PCB), a flexible PCB (FPCB), or a rigid-flexible PCB (RFPCB)). A repeated description of some of the reference numerals in FIG. 4 will be omitted.

According to the embodiment, the support member assembly (or a support structure) 400 is a frame structure capable of withstanding a load and may contribute to durability or rigidity of the electronic device 200. The support member assembly 400 may include a nonmetallic material (e.g., polymer) or a metallic material. The housing 210 (see FIG. 2A) including the back cover 212, the first side cover 213, or the second side cover 214, the pulley 460, the display support structure 220, the flexible display 230, the support sheet 470, the multi-bar structure 480, or the printed circuit board 490 may be disposed on or coupled to the support member assembly 400.

According to the embodiment, the support member assembly 400 may include a first support member 410, a second support member 420, a third support member 430, a fourth support member 440, or a fifth support member 450.

For example, the first support member (or a first bracket) 410 may be provided in the form of a plate. The display support structure 220 may be disposed on one surface 410a of the first support member 410. For example, the second support member (or a second bracket) 420 may be provided in the form of a plate that overlaps at least a part of the first support member 410 when viewed in the z direction. Alternatively, the second support member may be connected to the first support member 410 and/or the third support member 430. The second support member 420 may be positioned between the first support member 410 and the third support member 430. The third support member 430 may be coupled to the first support member 410 and/or the second support member 420. The printed circuit board 490 may be disposed between the first support member 410 and the second support member 420. The fourth support member 440 may be coupled to one side of a structure made by coupling the first support member 410, the second support member 420, and the third support member 430. The fifth support member 450 may be coupled to the other side of the structure made by coupling the first support member 410, the second support member 420, and the third support member 430. The fifth support member 450 may be positioned opposite to the fourth support member 440. The first side cover 213 may be coupled to the support member assembly 400 at the side of the fourth support member 440. The second side cover 214 may be coupled to the support member assembly 400 at the side of the fifth support member 450. The back cover 212 may be coupled to the support member assembly 400 at the side of the third support member 430. At least some of the first support member 410, the second support member 420, the third support member 430, the fourth support member 440, or the fifth support member 450 may include a metallic material and/or a nonmetallic material (e.g., polymer). According to various embodiments, at least two or more of the first support member 410, the second support member 420, the third support member 430, the fourth support member 440, and the fifth support member 450 may be integrated. According to any embodiment, the support member assembly 400 may be referred to as a structure that defines at least some of the first support member 410, the second support member 420, the third support member 430, the fourth support member 440, and the fifth support member 450. According to any embodiment, at least some of the first support member 410, the second support member 420, the third support member 430, the fourth support member 440, and the fifth support member 450 of the support member assembly 400 may be omitted.

For example, the first support member 410 may include a first side surface (not illustrated) configured to face the fourth support member 440, a second side surface 410c configured to face the fifth support member 450 and positioned opposite to the first side surface, a third side surface (not illustrated) configured to connect one end of the first side surface and one end of the second side surface 410c, or a fourth side surface 410d configured to connect the other end of the first side surface and the other end of the second side surface 410c and positioned opposite to the third side surface. According to the embodiment, the pulley 460 may be positioned in the vicinity of the third side surface of the first support member 410. As another example, in the case of the electronic device having the slide-out direction formed reversely, the pulley 460 may also be positioned in the vicinity of the fourth side surface 410d of the first support member 410. The pulley 460 may include a cylindrical roller 461 extending in the direction (e.g., the y-axis direction) from the fifth support member 450 to the fourth support member 440. The pulley 460 may include a first rotation shaft (not illustrated) connected to the roller 461, and a second rotation shaft 463. The first rotation shaft and the second rotation shaft 463 may be positioned opposite to each other with the roller 461 interposed therebetween. The first rotation shaft may be positioned between the roller 461 and the first side cover 213 and connected to the fourth support member 440. The second rotation shaft 463 may be positioned between the roller 461 and the second side cover 214 and connected to the fifth support member 450. The fourth support member 440 may include a first through-hole 441 into which the first rotation shaft is inserted. The fifth support member 450 may include a second through-hole 451 into which the second rotation shaft 463 is inserted. The roller 461 may rotate about the first rotation shaft disposed on the fourth support member 440 and rotate about the second rotation shaft 463 disposed on the fifth support member 450.

According to the embodiment, the display support structure 220 may be disposed on the support member assembly 400 and slide on the first support member 410. For example, a sliding structure may be provided between the first support member 410 and the display support structure 220. The sliding structure may couple the first support member 410 and the display support structure 220 and support and guide the movement of the display support structure 220. According to the embodiment, the sliding structure may include at least one elastic structure 401. When the display support structure 220 is moved by a preset distance by an external force, the at least one elastic structure 401 may change the state from the closed state in FIG. 2A to the open state in FIG. 3A or from the open state to the closed state without an additional external force. For example, the at least one elastic structure 401 may include various elastic member such as a torsion spring. For example, the torsion spring, which is the at least one elastic structure 401, may include one end connected to the display support structure 220, the other end connected to the first support member 410, and/or a spring portion between one end and the other end. When the display support structure 220 is moved by a preset distance in the first direction (e.g., the x-axis direction) of the slide-out by an external force, a position of one end is changed relative to the other end, such that the display support structure 220 may be moved in the first direction by elasticity of the spring portion without an additional external force. Therefore, the state may be changed from the closed state in FIG. 2A to the open state in FIG. 3A. When the display support structure 220 is moved by a preset distance in the second direction opposite to the first direction by an external force, a position of one end is changed relative to the other end, such that the display support structure 220 may be moved in the second direction by elasticity of the spring portion without an additional external force. Therefore, the state may be changed from the open state in FIG. 3A to the closed state in FIG. 2A.

According to various embodiments, the housing 210 may be defined to further include at least a part of the support member assembly 400. For example, the housing 210 may include a first surface (e.g., one surface 410a defined by the first support member 410) directed in the first direction (e.g., the +z-axis direction), and a second surface (e.g., the rear surface 210B in FIG. 2B) directed in the second direction (e.g., the −z-axis direction) opposite to the first surface (e.g., the one surface 410a). The display support structure 220 may be disposed on the first surface (e.g., one surface 410a defined by the first support member 410) of the housing 210 and be slidable in a third direction (e.g., the x-axis direction) perpendicular to the first direction.

According to the embodiment, the flexible display 230 may include a first area ⓐ extending from the second area ⓑ. The first area ⓐ may be disposed on the display support structure 220. When the state is changed from the closed state in FIG. 2A to the open state in FIG. 3A, the second area ⓑ connected to the first area ⓐ comes out while being slid by the movement of the display support structure 220, such that the screen (see the screen 230d in FIG. 3A) may be expanded. When the state is changed from the open state in FIG. 3A to the closed state in FIG. 2A, the second area ⓑ is at least partially retracted into the electronic device 200 by the movement of the display support structure 220, such that the screen (see the screen 230d in FIG. 2A) may be contracted. The support member assembly 400 may include the opening (not illustrated) through which the second area ⓑ is retracted or extended. The pulley 460 may be positioned in the opening. The opening may include one side gap between the first support member 410 and the third support member 430. A part (e.g., the support member 431) of the third support member 430 disposed adjacent to the opening may have a curved shape corresponding to the curved surface of the roller 461. The pulley 460 may be positioned to correspond to the second area ⓑ. When the state changes between the closed state in FIG. 2A and the open state in FIG. 3A, the pulley 460 may be rotated by the movement of the second area ⓑ.

According to the embodiment, the support sheet 470 may be attached to a rear surface of the flexible display 230. The rear surface of the flexible display 230 may refer to a surface positioned opposite to a surface through which light is emitted from the display panel including a plurality of pixels. The support sheet 470 may contribute to durability of the flexible display 230. The support sheet 470 may reduce an influence of a load or stress that may occur due to the change in state between the closed state in FIG. 2A and the open state in FIG. 3A and affect the flexible display 230. The support sheet 470 may prevent the flexible display 230 from being damaged by a force transmitted when the display support structure 220 moves. Although not illustrated, the flexible display 230 may include a first layer including a plurality of pixels, and a second layer coupled to the first layer. For example, the first layer may include a light-emitting layer including a plurality of pixels implemented by light-emitting elements such as organic light-emitting diodes (OLEDs) or micro light-emitting diodes (LED), and various other layers (e.g., optical layers, such as polarizing layers, for improving image quality or outdoor visibility of the screen). According to the embodiment, a plurality of pixels may not be disposed in a partial area of the flexible display 230 that at least partially overlaps at least one electronic component (e.g., the camera module or the sensor module) included in the electronic device 200 when viewed from above the screen 230d (see FIG. 2A or 3A) (e.g., when viewed in the −z-axis direction). According to any embodiment, a partial area of the flexible display 230, which at least partially overlaps at least one electronic component (e.g., the camera module or the sensor module) included in the electronic device 200 when viewed from above the screen 230d, may include a wiring structure and/or a pixel structure different from that in the other areas. For example, a partial area of the flexible display 230, which at least partially overlaps the at least one electronic component (e.g., the camera module or the sensor module), may have a pixel density different from that of the other areas. For example, a partial area of the flexible display 230, which at least partially overlaps the at least one electronic component (e.g., the camera module or the sensor module), may be implemented as a substantially transparent area defined by a change in pixel structure and/or wiring structure even without the opening. The second layer may include various layers that serve to support and protect the first layer (e.g., serve as buffer members (cushions)), block light, absorb or block electromagnetic waves, or diffuse, disperse, or dissipate heat. According to the embodiment, at least a part of the second layer may be configured as a conductive member (e.g., metal plate) and assist in reinforcing the rigidity of the electronic device 200. The at least a part of the second layer may be used to block peripheral noise and disperse heat discharged from a peripheral heat dissipation component (e.g., a display drive circuit). According to the embodiment, the conductive member may include at least one of copper (Cu), aluminum (Al), SUS (stainless steel), and CLAD (e.g., a stack member in which SUS and Al are alternately disposed).

The support sheet 470 may at least partially cover the second layer of the flexible display 230 and be attached to the rear surface of the second layer. The support sheet 470 may be made of various metallic materials and/or nonmetallic materials (e.g., polymers). According to the embodiment, the support sheet 470 may include stainless steel. According to any embodiment, the support sheet 470 may include engineering plastic. According to any embodiment, the support sheet 470 may be integrated with the flexible display 230. According to the embodiment, the support sheet 470 may include a first part (not illustrated) disposed along the first area ⓐ of the flexible display 230, and a second part (not illustrated) extending from the first part and disposed along the second area ⓑ of the flexible display 230. The second part may include a lattice structure including a plurality of openings. For example, the plurality of openings may be periodically formed and have substantially the same shape, and the plurality of openings may be arranged repeatedly at predetermined intervals. The support sheet 470 may provide elasticity (or elastic restoring force) that restores the second area ⓑ of the flexible display 230 to an unfolded state. However, the lattice structure of the second part may contribute to bendability of the second area ⓑ of the flexible display 230.

According to the embodiment, the multi-bar structure 480 may be connected to the display support structure 220 and include a third surface 481 configured to face the support sheet 470, and a fourth surface 482 positioned opposite to the third surface 481. When the display support structure 220 moves, the multi-bar structure 480 generates friction with the fourth surface 482, such that the movement and direction of the multi-bar structure 480 may be guided by the rotating roller 461. According to the embodiment, the fourth surface 482 may include a plurality of bars (not illustrated) arranged and extending in a direction (e.g., the y-axis direction) directed toward the first rotation shaft (not illustrated) from the second rotation shaft 463 of the pulley 460. The multi-bar structure 480 may be curved at portions between the plurality of bars. In various embodiments, the multi-bar structure 480 may be referred to as another term such as a 'flexible track' or 'hinge rail'.

According to the embodiment, in the closed state in FIG. 2A or the open state in FIG. 3A, at least a part of the multi-bar structure 480 may be positioned to overlap the screen 230*d* and support the second area ⓑ so that the second area ⓑ of the flexible display 230 is kept smoothly connected to the first area ⓐ of the flexible display 230 without being separated. The multi-bar structure 480 may contribute to the configuration in which the second area ⓑ is movable while being kept smoothly connected to the first area ⓐ without being separated when the state is changed between the closed state in FIG. 2A and the open state in FIG. 3A.

The separation, which occurs due to the elasticity of the flexible display 230 and/or the support sheet 470 in the state in which the screen is expanded (e.g., the open state in FIG. 3A), may cause a non-smooth screen. To prevent the non-smooth screen, a tension structure (not illustrated) may be provided for the flexible display 230 and/or the support sheet 470. The tension structure may contribute to a smooth sliding motion while maintaining tension.

According to the embodiment, a processor (e.g., the processor 120 in FIG. 1), a memory (e.g., the memory 130 in FIG. 1), and/or an interface (e.g., the interface 177 in FIG. 1) may be mounted on the printed circuit board 490. For example, the processor may include one or more of a central processing unit, an application processor, a graphic processing device, an image signal processor, a sensor hub processor, and a communication processor. For example, the memory may include a volatile memory or a non-volatile memory. For example, the interface may include a high-definition multimedia interface (HDMI), a universal serial bus (USB) interface, an SD card interface, and/or an audio interface. For example, the interface may electrically or physically connect the electronic device 200 to an external electronic device and include a USB connector, an SD card/MMC connector, or an audio connector. The electronic device 200 may be disposed on the printed circuit board 490 or include various other elements electrically connected to the printed circuit board 490. For example, the electronic device 200 may include a battery (not illustrated) positioned between the first support member 410 and the second support member 420 or between the second support member 420 and the back cover 212. The battery refers to a device for supplying electric power to at least one constituent element of the electronic device 200. For example, the battery may include a primary battery, which cannot be recharged, a rechargeable secondary battery, or a fuel cell. The battery may be integrally disposed in the electronic device 200 or disposed to be detachable from the electronic device 200. According to various embodiments, the electronic device 200 may include an antenna (not illustrated) positioned between the first support member 410 and the second support member 420 or between the second support member 420 and the back cover 212. For example, the antenna may include a near-field communication (NFC) antenna, a wireless charging antenna, and/or a magnetic secure transmission (MST) antenna. For example, the antenna may perform near-field communication with an external device or transmit or receive electric power required for charging in a wireless manner. In another embodiment, the antenna structure may be defined by a part of the first side cover 213 and/or a part of the second side cover 214 or a combination thereof.

According to the embodiment, the electronic device 200 may include a flexible printed circuit board (FPCB) 237 configured to electrically connect the flexible display 230 and the printed circuit board 490. For example, the flexible printed circuit board 237 may be electrically connected to the printed circuit board 490 through the opening (not illustrated) formed in the display support structure 220 and the opening (not illustrated) formed in the first support member 410.

Figure 5:
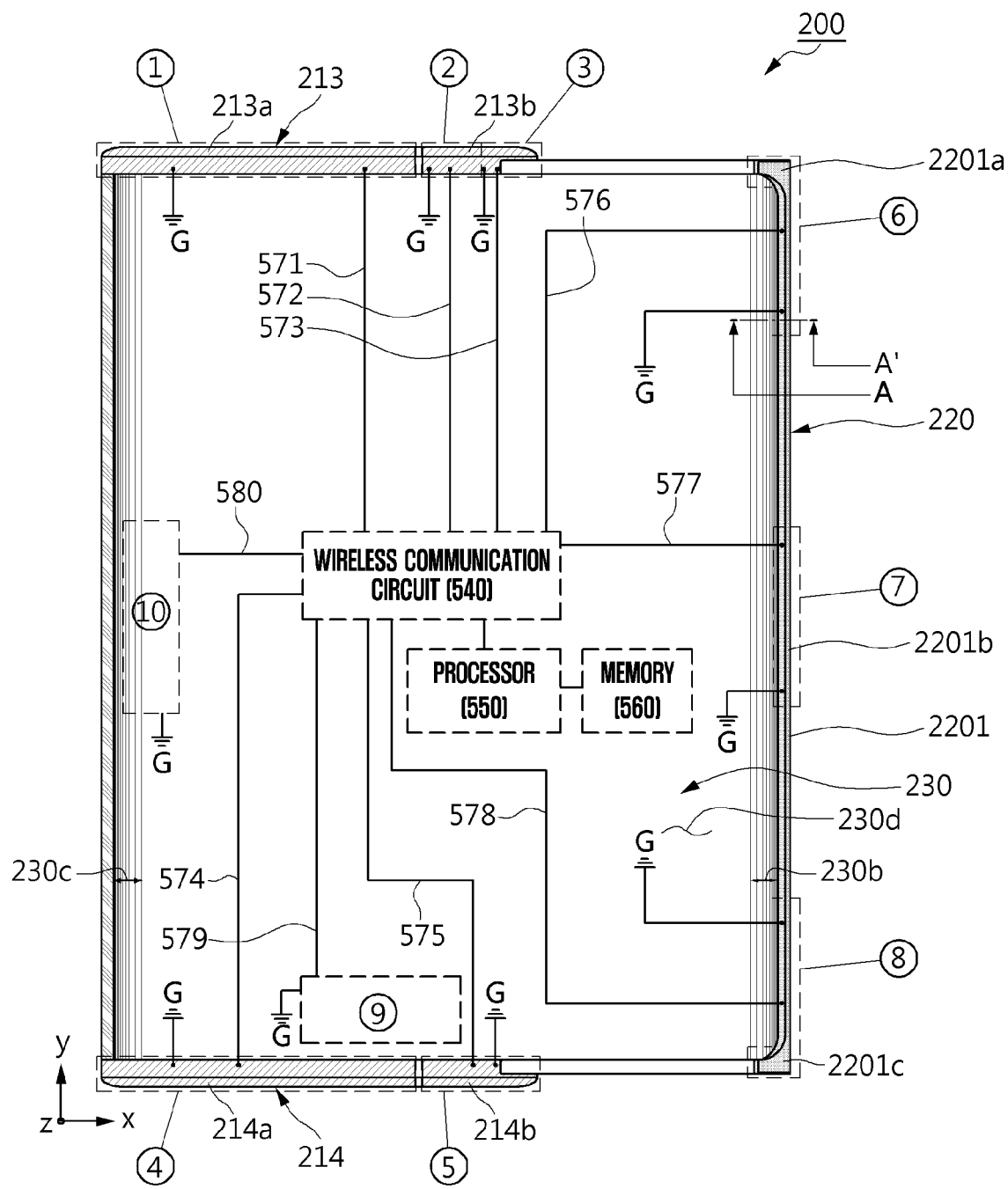
FIG. 5 is a view for explaining an antenna included in an electronic device according to an embodiment of the disclosure.

FIG. 5 is a view for explaining an antenna included in an electronic device according to an embodiment of the disclosure.

Referring to FIG. 5, in the embodiment, an electronic device 200 may include a processor 550 (e.g., the processor 120 in FIG. 1), a memory 560 (e.g., the memory 130 in FIG. 1), at least one antenna radiator r the antenna), a wireless communication circuit 540 (e.g., the wireless communication module 192 in FIG. 1), or at least one transmission line configured to electrically connect the at least one antenna radiator and the wireless communication circuit 540. For example, the at least one antenna radiator may include a first antenna radiator ①, a second antenna radiator ②, a third antenna radiator ③, a fourth antenna radiator ④, a fifth antenna radiator ⑤, a sixth antenna radiator ⑥, a seventh antenna radiator an eighth antenna radiator ⑧, a ninth antenna radiator ⑨, or a tenth antenna radiator ⑩. The transmission line may electrically connect the wireless communication circuit 540 and the antenna radiator and transmit a radio-frequency (RF) signal (voltage or current). For example, the transmission line may include an electrical path implemented by a conductive structure or line having various shapes and configured to connect the wireless communication circuit 540 and the antenna radiator. A ground G is an antenna ground. For example, the ground G may include a ground plane included in the printed circuit board 490 in FIG. 4. The antenna radiator may be electrically connected to the ground G through various electrical paths such as a flexible conductive member (e.g., a C clip, a pogo pin, a spring, a conductive poron, a conductive rubber, a conductive tape, or a cooper connector), an FPCB, or a cable. The wireless communication circuit 540 may be configured to transmit and/or receive a signal with a frequency band selected or designated by at least one antenna radiator. The wireless communication circuit 540, the processor 550, and/or the memory 560 may be disposed on the printed circuit board 490 in FIG. 4.

According to the embodiment, one first conductor 213*a* included in the first side cover 213 may be electrically connected to the wireless communication circuit 540 (e.g., the wireless communication module 192 in FIG. 1) and the ground G and operate as the first antenna radiator ①. A part of another first conductor 213*b* included in the first side cover 213 may be electrically connected to the wireless communication circuit 540 and the ground G and operate as the second antenna radiator ②. Another part of the first conductor 213*b* included in the first side cover 213 may be electrically connected to the wireless communication circuit 540 and the ground G and operate as the third antenna radiator ③. The first antenna radiator ① may be electrically connected to the wireless communication circuit 540 through a first transmission line 571. The second antenna radiator ② may be electrically connected to the wireless communication circuit 540 through a second transmission line 572. The third antenna radiator ③ may be electrically connected to the wireless communication circuit 540 through a third transmission line 573. For example, the first transmission line 571, the second transmission line 572, or the third transmission line 573 may include a flexible conductive member (e.g., a C clip, a pogo pin, a spring, a conductive poron, a conductive rubber, a conductive tape, or a cooper connector), an FPCB, or a cable between the first antenna radiator ①, the second antenna radiator ②, the third antenna radiator ③, and the printed circuit board 490 in FIG. 4. For example, the first transmission line 571, the second transmission line 572, or the third transmission line 573 may include a line disposed on the printed circuit board 490.

According to the embodiment, one second conductor 214a included in the second side cover 214 may be electrically connected to the wireless communication circuit 540 and the ground G and operate as the fourth antenna radiator ④. Another second conductor 214b included in the second side cover 214 may be electrically connected to the wireless communication circuit 540 and the ground G and operate as the fifth antenna radiator ⑤. The fourth antenna radiator ④ may be electrically connected to the wireless communication circuit 540 through a fourth transmission line 574. The fifth antenna radiator ⑤ may be electrically connected to the wireless communication circuit 540 through a fifth transmission line 575. For example, the fourth transmission line 574 or the fifth transmission line 575 may include a flexible conductive member (e.g., a C clip, a pogo pin, a spring, a conductive poron, a conductive rubber, a conductive tape, or a cooper connector), an FPCB, or a cable between the fourth antenna radiator ④, the fifth antenna radiator ⑤, and the printed circuit board 490 in FIG. 4. For example, the fourth transmission line 574 or the fifth transmission line 575 may include a line disposed on the printed circuit board 490.

According to the embodiment, a first part 2201a of the display support structure 220 including a part of the third rim portion 2201 may be electrically connected to the wireless communication circuit 540 and the ground G and operate as the sixth antenna radiator ⑥. A second part 2201b of the display support structure 220 including another part of the third rim portion 2201 may be electrically connected to the wireless communication circuit 540 and the ground G and operate as the seventh antenna radiator ⑦. A third part 2201c of the display support structure 220 including another part of the third rim portion 2201 may be electrically connected to the wireless communication circuit 540 and the ground G and operate as the eighth antenna radiator ⑧. The sixth antenna radiator ⑥ may be electrically connected to the wireless communication circuit 540 through a sixth transmission line 576. The seventh antenna radiator ⑦ may be electrically connected to the wireless communication circuit 540 through a seventh transmission line 577. The eighth antenna radiator ⑧ may be electrically connected to the wireless communication circuit 540 through an eighth transmission line 578. For example, the seventh transmission line 577, the eighth transmission line 578, or a ninth transmission line 579 may include an electrical path (e.g., an FPCB, a cable, or a line of the printed circuit board 490 in FIG. 4) implemented by a conductive structure or line having various shapes and configured to connect the sixth antenna radiator ⑥, the seventh antenna radiator ⑦, the eighth antenna radiator ⑧, and the wireless communication circuit 540.

According to the embodiment, the ninth antenna radiator ⑨ and the tenth antenna radiator ⑩ may be disposed different positions in the internal space of the electronic device 200 and between the first side cover 213 and the second side cover 214 when viewed toward the screen 230d. For example, the ninth antenna radiator ⑨ may be positioned to be closer to the second side cover 214 than the first side cover 213 when viewed toward the screen 230d. The tenth antenna radiator ⑩ may be positioned to be closer to the second curved portion 230c than the first curved portion 230b of the screen 230d when viewed toward the screen 230d. With reference to FIG. 2B, 3B, or 4, for example, the ninth antenna radiator ⑨ or the tenth antenna radiator ⑩ may include a conductive pattern disposed on one surface (not illustrated) of the support member assembly 400 that faces the back cover 212 or the back cover 212 in FIG. 2B, 3B, or 4. According to the embodiment, the conductive pattern may be implemented as laser direct structuring (LDS). The LDS may refer to a method of forming the conductive pattern by designing a pattern on a structure (e.g., the back cover 212 or at least a part of the support member assembly 400) made of polymer such as polycarbonate by using a laser and then plating an upper portion of the structure with an electrically conductive material such as copper or nickel. According to another embodiment, the conductive pattern may be implemented in the form of a flexible printed circuit (FPCB). According to various embodiments, the conductive pattern may be implemented in various other ways such as plating, printing, or SUS. According to various embodiments, the ninth antenna radiator ⑨ or the tenth antenna radiator ⑩ may include a conductive pattern (e.g., microstrip) disposed on the printed circuit board 490. The conductive pattern may be electrically connected to the wireless communication circuit 540 and the ground G and operate as the ninth antenna radiator or the tenth antenna radiator ⑩. The ninth antenna radiator ⑨ may be electrically connected to the wireless communication circuit 540 through the ninth transmission line 579. The tenth antenna radiator ⑩ may be electrically connected to the wireless communication circuit 540 through a tenth transmission line 580. The positions or number of conductive patterns used as the antenna radiators may be variously implemented without being limited to the embodiment in FIG. 5.

According to the embodiment, the wireless communication circuit 540 may provide radiation current (or radio signal) to at least one antenna radiator (e.g., the first antenna radiator ①, the second antenna radiator ②, the third antenna radiator ③, the fourth antenna radiator ④, the fifth antenna radiator ⑤, the sixth antenna radiator ⑥, the seventh antenna radiator ⑦, the eighth antenna radiator ⑧, the ninth antenna radiator ⑨, or the tenth antenna radiator ⑩. A path of at least one antenna radiator through which the radiation current flows and/or the distribution of the radiation current may transmit and/or receive a signal having at least one frequency in the corresponding frequency band. The wireless communication circuit 540 may process a transmission signal or a reception signal in at least one designated frequency band through at least one antenna radiator. For example, the designated frequency band may include at least one of low band (LB) (i.e., about 600 MHz to about 1 GHz), middle band (MB) (i.e., about 1 GHz to about 2.3 GHz), high band (HB) (i.e., about 2.3 GHz to about 2.7 GHz), and ultra-high band (UHB) (i.e., about 2.7 GHz to about 6 GHz). According to various embodiments, the designated frequency band may include various other frequency bands.

Figure 6:
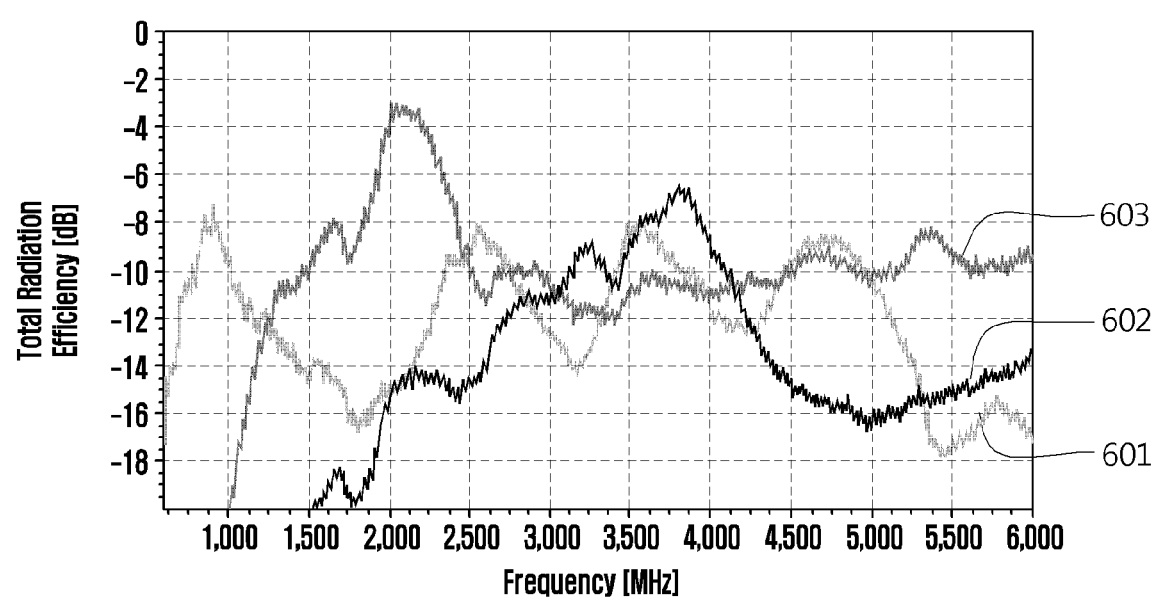
FIG. 6 is a graph illustrating antenna radiation performance in a frequency distribution related to a first antenna radiator, a second antenna radiator, and a third antenna radiator in FIG. 5 according to an embodiment of the disclosure.

FIG. 6 is a graph illustrating antenna radiation performance related to the first antenna radiator ①, the second antenna radiator ②, and the third antenna radiator ③ in FIG. 5 according to an embodiment of the disclosure.

Referring to FIG. 6, in the embodiment, reference numeral '601' indicates antenna radiation performance related to the first antenna radiator ①. Reference numeral '602' indicates antenna radiation performance related to the second antenna radiator ②. Reference numeral '603' indicates antenna radiation performance related to the third antenna radiator ③. Referring to FIGS. 5 and 6, the wireless communication circuit 540 may transmit and/or receive an LB signal through the first antenna radiator ①, and the related antenna radiation performance may be in an important range of a performance ensuring level. The wireless communication circuit 540 may transmit and/or receive an UHB signal (e.g., a signal of about 3.5 GHz to about 4 GHz) through the second antenna radiator ②, and the related antenna radiation performance may be in the important range of the performance ensuring level. The wireless communication circuit 540 may transmit and/or receive a signal with an MB, HB, or GPS (global positioning system) band through the third antenna radiator ③, and the related antenna radiation performance may be in the important range of the performance ensuring level.

Referring to FIG. 5, in the embodiment, a wireless communication circuit 540 may transmit and/or receive an LB signal through the fourth antenna radiator ④. The wireless communication circuit 540 may transmit and/or receive an MB and/or HB signal through the fifth antenna radiator ⑤. According to various embodiments, the wireless communication circuit 540 may transmit and/or receive an LB, MB, HB, or UHB signal through the sixth antenna radiator ⑥, the seventh antenna radiator Q, the eighth antenna radiator ⑧, the ninth antenna radiator ⑨, or the tenth antenna radiator ⑩.

According to the embodiment, the wireless communication circuit 540 (e.g., the wireless communication module 192 in FIG. 1) or the processor 550 (e.g., the processor 120 in FIG. 1) may transmit and/or receive data through an MIMO technique by using a plurality of antenna radiators in a communication mode using the corresponding frequency band. The memory 560 (e.g., the memory 130 in FIG. 1) electrically connected to the processor 550 may store instructions that allow the processor 550 to transmit or receive data through the MIMO technique by selectively using a plurality of antenna radiators, among the first antenna radiator ①, the second antenna radiator ②, the third antenna radiator ③, the fourth antenna radiator ④, the fifth antenna radiator ⑤, the sixth antenna radiator ⑥, the seventh antenna radiator ⑦, the eighth antenna radiator ⑧, the ninth antenna radiator ⑨, and the tenth antenna radiator ⑩, based on a communication mode. For example, the MIMO technique may include a 'beam forming' method of removing peripheral interference and improving performance by adjusting signal intensity in accordance with a base station (or a transmitter) and a user's position angle by adjusting phase information of each of the antenna radiators. For example, the MIMO technique may include a 'diversity' method of improving performance by providing a distance between the antenna radiators to independently generate signals between the antenna radiator. For example, the MIMO technique may include a 'multiplexing' method of increasing a transmission speed by making imaginary auxiliary channels between transmission/receiving antenna radiators and transmitting different data through transmitting antennas. According to the embodiment, a technique may be used in which the base station transmits different data through the transmitting antennas and the electronic device 200 identifies transmitted data by appropriately processing signals. For example, a 4×4 MIMO technique may use four antenna radiators for the base station (or the transmitter) and the electronic device 200 (or the receiver).

According to various embodiments, the wireless communication circuit 540 or the processor 550 may be configured to selectively use the antenna radiator in accordance with the closed state (see FIG. 2A) or the open state (see FIG. 3A or 5) of the electronic device 200 in the communication mode using the corresponding frequency band. The memory 560 may store instructions that allow the processor 550 to selectively use at least one of the first antenna radiator ①, the second antenna radiator ②, the third antenna radiator ③, the fourth antenna radiator ④, the fifth antenna radiator ⑤, the sixth antenna radiator ⑥, the seventh antenna radiator ⑦, the eighth antenna radiator ⑧, the ninth antenna radiator ⑨, and the tenth antenna radiator ⑩ based on the closed state or the open state of the electronic device 200. For example, in the closed state of the electronic device 200, the first antenna radiator ①, the second antenna radiator ②, the third antenna radiator ③, the fourth antenna radiator ④, or the fifth antenna radiator ⑤ may be used. For example, in the open state of the electronic device 200, the sixth antenna radiator ⑥, the seventh antenna radiator Q, or the eighth antenna radiator ⑧ may be used.

According to various embodiments, the wireless communication circuit 540 or the processor 550 may be configured to selectively use the antenna radiator based on the instructions stored in the memory 560 and based on a position at which the user grips the electronic device 200. For example, at least one antenna radiator, which is advantageous in ensuring antenna radiation performance in the corresponding communication mode and spaced apart from a position at which the electronic device gripped by the user's hand, may be selected and operated.

According to various embodiments, an antenna device may further include a frequency adjustment circuit (not illustrated) connected to a transmission line between at least one antenna radiator (e.g., the first antenna radiator ①, the second antenna radiator ②, the third antenna radiator ③, the fourth antenna radiator ④, the fifth antenna radiator ⑤, the sixth antenna radiator ⑥, the seventh antenna radiator ⑦, the eighth antenna radiator ⑧, the ninth antenna radiator ⑨, or the tenth antenna radiator ⑩) and the wireless communication circuit 540. The frequency adjustment circuit may include an electrical element having a component such as inductance, capacitance, or conductance applied to the transmission line. For example, the frequency adjustment circuit may include various elements such as a lumped element or a passive element. According to the embodiment, the frequency adjustment circuit (e.g., matching circuit) may adjust impedance of the transmission line or impedance of the antenna radiator. Therefore, the impedance of the transmission line and the impedance of the antenna radiator may be matched (e.g., impedance matching). The impedance matching may induce a flow of an efficient signal at a particular frequency. The impedance of the antenna radiator may be related to transmission of electric power from the transmitter (e.g., the wireless communication circuit 540) to the antenna radiator or transmission of electric power from the antenna radiator to the receiver (e.g., the wireless communication circuit 540). When the impedance of the antenna radiator and the impedance of the transmission line are matched, reflection at a connection part between the transmission line and the antenna radiator may be minimized, such that maximum electric power transmission (or minimization of electric power loss) or efficient signal transmission through the antenna radiator may be possible. According to various embodiments, the frequency adjustment circuit may move a resonant frequency of at least one antenna radiator to a designated frequency or move the resonant frequency by a designated degree.

According to various embodiments, in the closed state (see FIG. 2A) of the electronic device 200, the frequency adjustment circuit may reduce an electromagnetic influence from another antenna radiator (e.g., the second antenna radiator ②, the third antenna radiator ③, or the fifth antenna radiator ⑤) or various elements of the electronic device 200 by the sixth antenna radiator ⑥, the seventh antenna radiator Q, or the eighth antenna radiator ⑧. The frequency adjustment circuit may allow the sixth antenna radiator ⑥, the seventh antenna radiator Q, or the eighth antenna radiator ⑧ to have designated isolation in the closed state of the electronic device 200. Therefore, in the closed state of the electronic device 200, the antenna radiation performance for the sixth antenna radiator ⑥, the seventh antenna radiator ⑦, or the eighth antenna radiator ⑧ may be ensured at a desired level or reach the antenna radiation performance in the open state (see FIG. 3A or 5) of the electronic device 200.

Figure 7:
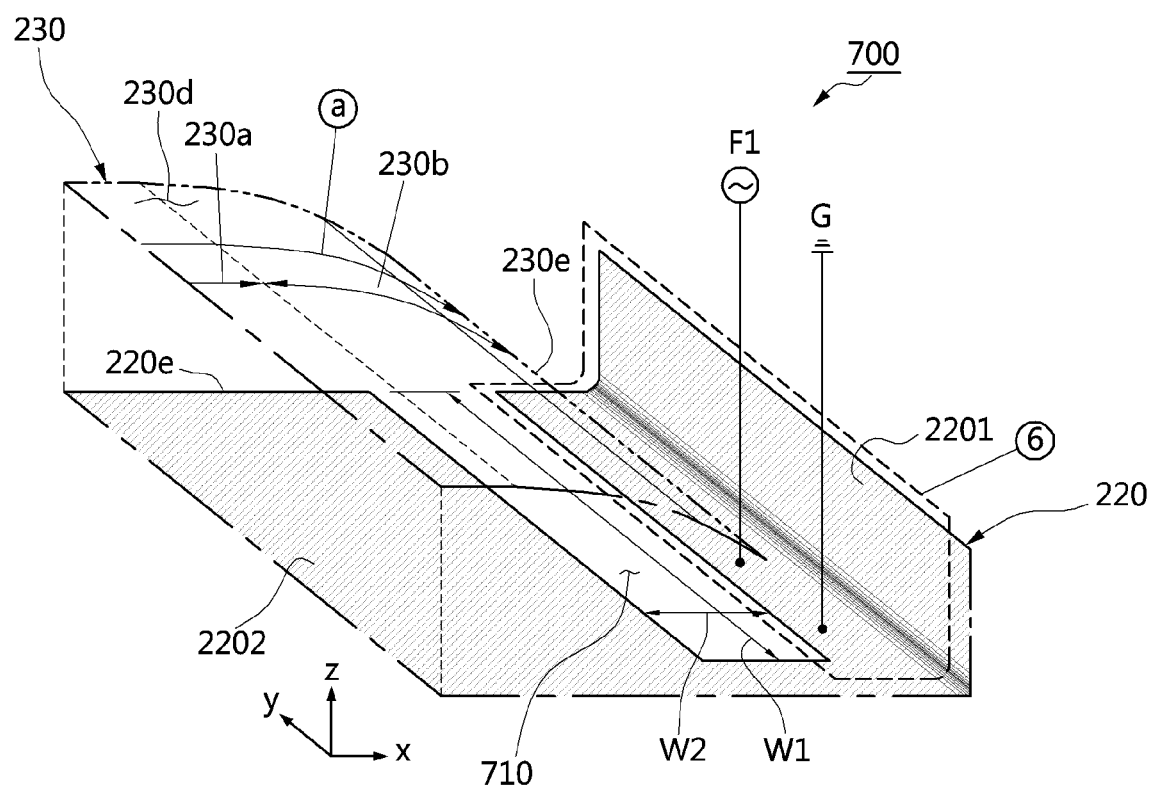
FIG. 7 is a view schematically illustrating an antenna related to a sixth antenna radiator in the electronic device in FIG. 5 according to an embodiment of the disclosure.

FIG. 7 schematically illustrates an antenna related to a sixth antenna radiator ⑥ in the electronic device in FIG. 5 according to an embodiment of the disclosure.

Referring to FIG. 7, in the embodiment, an antenna 700 may include the sixth antenna radiator ⑥ defined by a part of the display support structure 220, and a feeding unit F1 and the ground G electrically connected to the sixth antenna radiator ⑥.

According to the embodiment, the display support structure 220 may include the third rim portion 2201 (see FIG. 2A or 3A) disposed to face an edge 230e of the flexible display 230 and protect the edge 230e, or a support portion 2202 extending from the third rim portion 2201 and facing the first area ⓐ of the flexible display 230. At least a part of the display support structure 220 may include a conductive member including the third rim portion 2201 and the support portion 2202. For example, the third rim portion 2201 and the support portion 2202 may be integrated. The support portion 2202 may include a support structure for disposing the first area ⓐ of the flexible display 230. In FIG. 7, the third rim portion 2201 and the support portion 2202 are schematically illustrated to understand the antenna 700, but the third rim portion 2201 and the support portion 2202 may be implemented in a form that may protect and support the flexible display 230.

For example, the screen 230d may be an area of the flexible display 230 that is visible to the outside. According to the embodiment, the screen 230d may include the first curved portion 230b curvedly extending from the planar portion 230a or the planar portion 230a and positioned between the planar portion 230a and the third rim portion 2201. FIG. 7 illustrates the schematically flat support portion 2202 of the display support structure 220 for structural understanding of the antenna 700. However, the support portion 2202 may be substantially formed in a shape for disposing and supporting the first curved portion 230b and the planar portion 230a of the screen 230d.

According to any embodiment, the planar portion 230a may be disposed to be expanded while substituting for the first curved portion 230b, and the support portion 2202 may be formed in a shape corresponding to the planar portion 230a.

According to the embodiment, the display support structure 220 may include a slot (or slit) (e.g., the opening) 710. For example, the slot 710 may have a first width W1 extending in the y-axis direction (e.g., the direction between the first side cover 213 and the second side cover 214 in FIG. 5) and a second width W2 extending in the x-axis direction. For example, the first width W1 may be larger than the second width W2. According to the embodiment, the slot 710 may extend to an edge 220e positioned in the y-axis direction. According to the embodiment, the slot 710 may be formed in the support portion 2202. However, the disclosure is not limited thereto, and the slot 710 may be formed in the third rim portion 2201 or expanded to the third rim portion 2201. The sixth antenna radiator ⑥ is a part of the display support structure 220 at the periphery of the slot 710 and may form an electromagnetic field capable of transmitting and/or receiving a signal with at least one frequency in the corresponding frequency band when the radiation current is provided from the feeding unit F1 to the display support structure 220. The feeding unit F1 may be a structure (e.g., a feeding structure) that allows the wireless communication circuit 540 in FIG. 5 to provide the radiation current to the display support structure 220. The display support structure 220 may be electrically connected to the ground G (e.g., the ground plane included in the printed circuit board 490 in FIG. 4). Therefore, the sixth antenna radiator ⑥ may be kept electrically connected to the ground G. The slot 710 may contribute to allowing the display support structure 220 to implement the sixth antenna radiator ⑥ for a path through which the radiation current flows and/or a distribution of the radiation current when the radiation current is provided to the feeding unit F1. With the slot 710, the display support structure 220 may include a part that operates as the sixth antenna radiator ⑥, and a part (not illustrated) that is electrically connected to the ground G and operates as the antenna ground. According to the embodiment, the position or shape of the slot 710 and the position or shape of the sixth antenna radiator ⑥ may be variously implemented based on a frequency of a signal to be transmitted and/or received without being limited to the embodiment in FIG. 7. According to the embodiment, the sixth antenna radiator ⑥ may operate as an inverted F antenna (IFA).

According to various embodiments (not illustrated), the antenna related to the eighth antenna radiator ⑧ in FIG. 5 may be implemented in substantially the same way as the antenna 700 related to the sixth antenna radiator ⑥ according to the embodiment in FIG. 7. For example, the eighth antenna radiator ⑧ may include a slot formed in the display support structure 220, and the slot may extend to an edge positioned in the −y-axis direction (e.g., an edge at a side of the second side cover 214 in the closed state in FIG. 2A).

Figure 8:
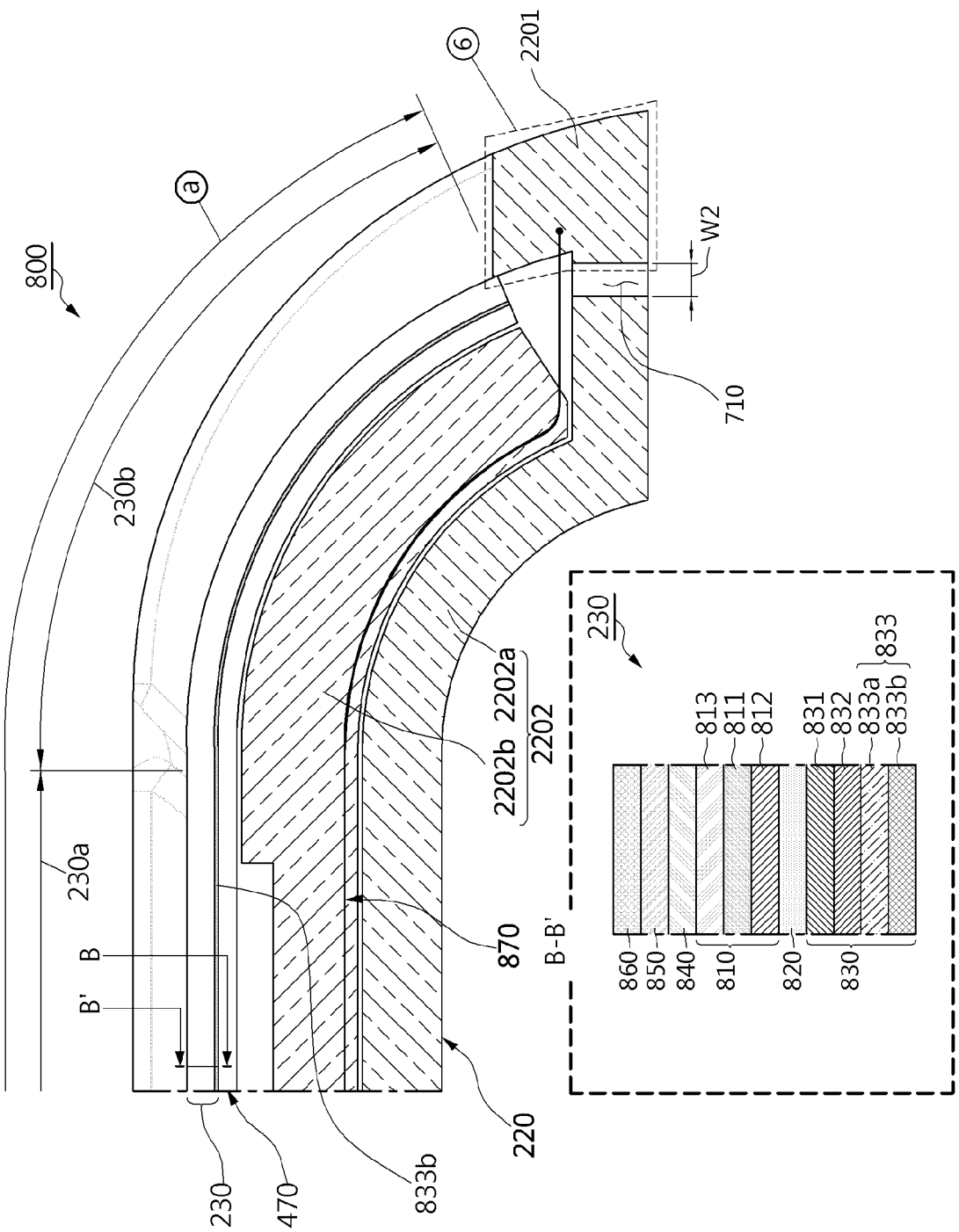
FIG. 8 is a view illustrating a cross-sectional structure taken along line A-A' in the electronic device in FIG. 5 according to an embodiment of the disclosure.

FIG. 8 illustrates a cross-sectional structure taken along line A-A' in the electronic device in FIG. 5 according to an embodiment of the disclosure.

Referring to FIG. 8, in the embodiment, a cross-sectional structure 800 may include the display support structure 220, the flexible display 230, or the support sheet 470. The display support structure 220 may include the third rim portion 2201 and the support portion 2202. The first area ⓐ of the flexible display 230 may be disposed on the display support structure 220. The support sheet 470 may be attached to at least a part of the rear surface of the flexible display 230. For example, the support sheet 470 may not be disposed on at least a part of the first curved portion 230b or the planar portion 230a. A repeated description of some of the reference numerals in FIG. 8 will be omitted.

According to the embodiment, the support portion 2202 may include a conductive portion 2202a connected to the third rim portion 2201 or integrated with the third rim portion 2201, or a non-conductive portion 2202b coupled to the conductive portion 2202a. The non-conductive portion 2202b may dispose and support the flexible display 230 between the conductive portion 2202a and the flexible display 230. According to any embodiment, a conductive member may substitute for the non-conductive portion 2202b, and the conductive member may be connected to the conductive portion 2202a or integrated with the conductive portion 2202a.

According to the embodiment, the non-conductive member may be disposed in the slot 710 of the display support structure 220 by injection molding or the like. The non-conductive member disposed in the slot 710 may reduce deterioration in rigidity of the display support structure 220 caused by the slot 710. According to any embodiment (not illustrated), the non-conductive portion 2202b may be expanded to the slot 710.

According to the embodiment, along line B-B' in FIG. 8, the flexible display 230 may include at least one of a display panel 810 (display panel), a base film 820, a lower panel 830, an optical layer 840, an optical transparent bonding member 850, or a transparent cover 860. The base film 820 may be positioned between the display panel 810 and the lower panel 830. A bonding member (not illustrated) made of various polymers may be disposed between the display panel 810 and the base film 820 and/or between the base film 820 and the lower panel 830.

According to the embodiment, the display panel 810 may include a light-emitting layer 811 and a thin-film transistor (TFT) film 812. For example, the light-emitting layer 811 may include a plurality of pixels implemented by light-emitting elements such as OLEDs or micro LEDs. The light-emitting layer 811 may be disposed on the TFT film 812 by depositing (evaporating) organic materials. For example, the TFT film 812 may be positioned between the light-emitting layer 811 and the base film 820. The TFT film 812 may refer to a structure in which at least one TFT is disposed on a flexible substrate (e.g., a PI film) by a series of processes such as deposition, patterning, or etching. At least one TFT may turn on or off the pixel or adjust brightness of the pixel by controlling electric current in respect to the light-emitting element of the light-emitting layer 811. For example, at least one TFT may be implemented as an amorphous silicon (a-Si) TFT, a liquid crystalline polymer (LCP) TFT, a low-temperature polycrystalline oxide (LTPO) TFT, or a low-temperature polycrystalline silicon (LTPS) TFT. The display panel 810 may include a storage capacitor. The storage capacitor may maintain a voltage signal in the pixel, maintain a voltage applied to the pixel in a single frame, or reduce a change in gate voltage of the TFT caused by leakage current (leakage) for a light-emitting time. A routine (e.g., initialization or data write) for controlling at least one TFT may allow the storage capacitor to maintain the voltage applied to the pixel at a predetermined time interval.

According to the embodiment, the display panel 810 may be implemented by OLEDs, the display panel 810 may include an encapsulation layer (e.g., thin-film encapsulation (TFE)) 813 that covers the light-emitting layer 811. An organic material and an electrode, which emit light from the OLED, may lose light-emitting characteristics because the organic material and the electrode more sensitively react with oxygen and/or moisture. According to the embodiment, the encapsulation layer 813 may seal the light-emitting layer 811 to prevent oxygen and/or moisture from penetrating into the OLED.

According to the embodiment, the base film 820 may include a flexible film made of a material such as polyimide or polyester (PET). The base film 820 may serve to support and protect the display panel 810. According to any embodiment, the base film 820 may be called a protective film, a back film, or a back plate.

According to various embodiments, the camera module 254 may be disposed at a lower end of at least a part of the screen 230d of the flexible display 230, and the position of the camera module 254 may not be visually exposed without being limited to the embodiment in FIG. 2B or 3B. In this case, some of the plurality of layers included in the display panel 810 may be formed as buffer layers (e.g., opaque metal layers) including designated patterns (black matrices) or designated patterns for reducing diffraction of light introduced into the camera module 254.

According to the embodiment, the lower panel 830 may include the plurality of layers for various functions. The bonding member (not illustrated) made of various polymers may be disposed between the plurality of layers. According to the embodiment, the lower panel 830 may include a light-blocking layer 831, a buffer layer 832, or a lower layer 833. The light-blocking layer 831 may be positioned between the base film 820 and the buffer layer 832. The buffer layer 832 may be positioned between the light-blocking layer 831 and the lower layer 833.

According to the embodiment, the light-blocking layer 831 may block light introduced from the outside. For example, the light-blocking layer 831 may include an embo-layer. The embo-layer may be a black layer including an unevenness pattern.

According to the embodiment, the buffer layer 832 may mitigate external impact applied to the flexible display 230. For example, the buffer layer 832 may include a sponge layer or a cushion layer.

According to the embodiment, the lower layer 833 may diffuse, disperse, or dissipate heat generated from the electronic device 200 or the flexible display 230. The lower layer 833 may absorb or block electromagnetic waves. The lower layer 833 may mitigate external impact applied to the electronic device 200 or the flexible display 230. For example, the lower layer 833 may include a composite sheet 833a or a conductive sheet 833b (e.g., a copper sheet) for blocking EMI (electromagnetic interference). According to the embodiment, the composite sheet 833a may be a sheet by combining and processing layers or sheets having different properties. For example, the composite sheet 833a may include at least one of polyimide and graphite. The composite sheet 833a may be substituted with a single sheet including a single material (e.g., polyimide or graphite). The composite sheet 833a may be positioned between the buffer layer 832 and the EMI blocking conductive sheet 833b. The lower layer 833 may include various layers for various other functions.

According to various embodiments (not illustrated), at least one of additional polymer layers (e.g., layers including PI, PET, or thermoplastic polyurethane (TPU)) may be further disposed on the rear surface of the display panel 810 in addition to the base film 820.

According to various embodiments, at least one of the plurality of layers (e.g., the light-blocking layer 831, the buffer layer 832, the composite sheet 833a, and the EMI blocking conductive sheet 833b) included in the lower panel 830 may be eliminated. According to various embodiments, the arrangement order of the plurality of layers included in the lower panel 830 may be variously changed without being limited to the embodiment in FIG. 8.

According to various embodiments, at least some of the plurality of layers included in the lower layer 833 may include an opening formed to correspond to a sensor (e.g., a fingerprint sensor) positioned in the electronic device 200. The sensor may overlap the opening or be at least partially inserted into a space of the opening. At least two or more layers may each include an opening, the openings formed in the layers may overlap one another and have substantially the same size and shape. According to any embodiment, the openings formed in the layers may not be identical in size or shape to one another.

According to the embodiment, the transparent cover 860 may cover the display panel 810 of the flexible display 230. The transparent cover 860 may protect the flexible display 230 from the outside. For example, the transparent cover 860 may be implemented in the form of a thin film (e.g., a thin-film layer) that may contribute to bendability. According to the embodiment, transparent cover 860 may include a plastic film (e.g., a polyimide film) or a thin-film glass (e.g., an ultra-thin glass (UTG). The optical layer 840 may be positioned between the transparent cover 860 and the display panel 810.

According to various embodiments (not illustrated), the transparent cover 860 may include a plurality of layers. For example, the transparent cover 860 may have a shape in which various coating layers are disposed on a plastic film or a thin-film glass. For example, the transparent cover 860 may have a shape in which at least one protective layer or coating layer including a polymer material (e.g., PET (polyester), PI (polyimide), or TPU (thermoplastic polyurethane)) is disposed on a plastic film or thin-film glass.

For example, the optical layer 840 may include a polarizing layer (a polarizing layer or polarizer), or a phase delay layer (a retardation layer or retarder). The polarizing layer and phase delay layer may improve outdoor visibility of the screen. According to the embodiment, the optical layer 840 may selectively transmit light that is generated from a light source of the display panel 810 and vibrates in a predetermined direction. According to various embodiments, the polarizing layer and the phase delay layer may be combined to provide a single layer, and this layer may be defined as a 'circularly polarized light layer'. The optical transparent bonding member 850 may be positioned between the transparent cover 860 and the optical layer 840, and, for example, include optical clear adhesive (OCA), optical clear resin (OCR), or super view resin (SVR). According to various embodiments, the polarizing layer (or the circularly polarized light layer) may be eliminated. In this case, the black pixel define layer (PDL) and/or a color filter for substituting for the polarizing layer may be formed.

According to various embodiments (not illustrated), the flexible display 230 may include a touch detection circuit (e.g., a touch sensor). The touch detection circuit may be implemented as a transparent conductive layer (or film) based on various electrically conductive materials such as indium tin oxide (ITO). According to the embodiment, the touch detection circuit may be disposed between the transparent cover 860 and the optical layer 840 (e.g., add-on type). According to another embodiment, the touch detection circuit may be disposed between the display panel 810 and the optical layer 840 (e.g., on-cell type). According to another embodiment, the display panel 810 may include a touch detection circuit or a touch detection function (e.g., in-cell type).

According to various embodiments (not illustrated), the display panel 810 may be based on OLEDs and include the encapsulation layer (e.g., thin-film encapsulation (TFE)) 813 disposed between the light-emitting layer 811 and the optical layer 840. For example, the encapsulation layer 813 may serve as a pixel protection layer for protecting the plurality of pixels of the light-emitting layer 811. According to various embodiments (not illustrated), the flexible display 230 may be a touch detection circuit provided between the encapsulation layer 813 and the optical layer 840 and disposed on the encapsulation layer 813 and include a conductive pattern such as a metal mesh (e.g., an aluminum metal). For example, to correspond to the curved flexible display 230, the metal mesh may have higher durability than the transparent conductive layer implemented by ITO.

According to various embodiments (not illustrated), the flexible display 230 may further include to the pressure sensor configured to measure intensity (pressure) of touch.

According to various embodiments (not illustrated), some of the plurality of layers included in the lower panel 830 may include a digitizer for detecting a pen input device (e.g., a stylus pen). For example, the digitizer may be an electromagnetic induction panel for detecting the pen input device that operates in a magnetic field method. According to various embodiments, the electromagnetic induction panel may be eliminated in accordance with a method of implementing the pen input device. For example, the electromagnetic induction panel may be eliminated in an embodiment in which the pen input device generates a signal by using electric power of a battery included in the pen input device.

According to various embodiments, the display panel 810, or the plurality of layers included in the lower panel 830, the layered structure thereof, or the stacking order may be variously implemented. According to various embodiments, the flexible display 230 may be implemented by eliminating some of the constituent elements or adding other constituent elements in accordance with the tendency of the provided form or convergence.

According to the embodiment, the wireless communication circuit 540 in FIG. 5 may be electrically connected to the sixth antenna radiator ⑥ through an electrical path 870 such as an FPCB or cable. For example, the electrical path 870 may be disposed on the display support structure 220 or in the display support structure 220.

Referring to FIGS. 7 and 8, in the embodiment, the first area ⑨ of the flexible display 230 may be disposed on the support structure 220 to reduce an influence applied to the antenna radiation performance of the sixth antenna radiator ⑥. For example, the EMI blocking conductive sheet 833b may be disposed to be spaced apart from the sixth antenna radiator ⑥ at a level at which the antenna radiation performance of the sixth antenna radiator ⑥ may be ensured. For example, the EMI blocking conductive sheet 833b may be disposed so as not to substantially overlap the sixth antenna radiator ⑥ when viewed from above the planar portion 230a. Therefore, the EMI blocking conductive sheet 833b may reduce an electromagnetic influence (e.g., deterioration in antenna radiation performance) applied to the sixth antenna radiator ⑥.

According to various embodiments, the support sheet 470 may include a metallic material and be disposed to be spaced apart from the sixth antenna radiator ⑥ at a level at which the antenna radiation performance may be ensured. According to various embodiments, the support sheet 470 may be disposed so as not to substantially overlap the sixth antenna radiator ⑥ when viewed from above the planar portion 230a. Therefore, the support sheet 470 may reduce an electromagnetic influence (e.g., deterioration in antenna radiation performance) applied to the sixth antenna radiator ⑥. According to any embodiment, the support sheet 470 may be eliminated from the first area ⑨ of the flexible display 230.

Figure 9:
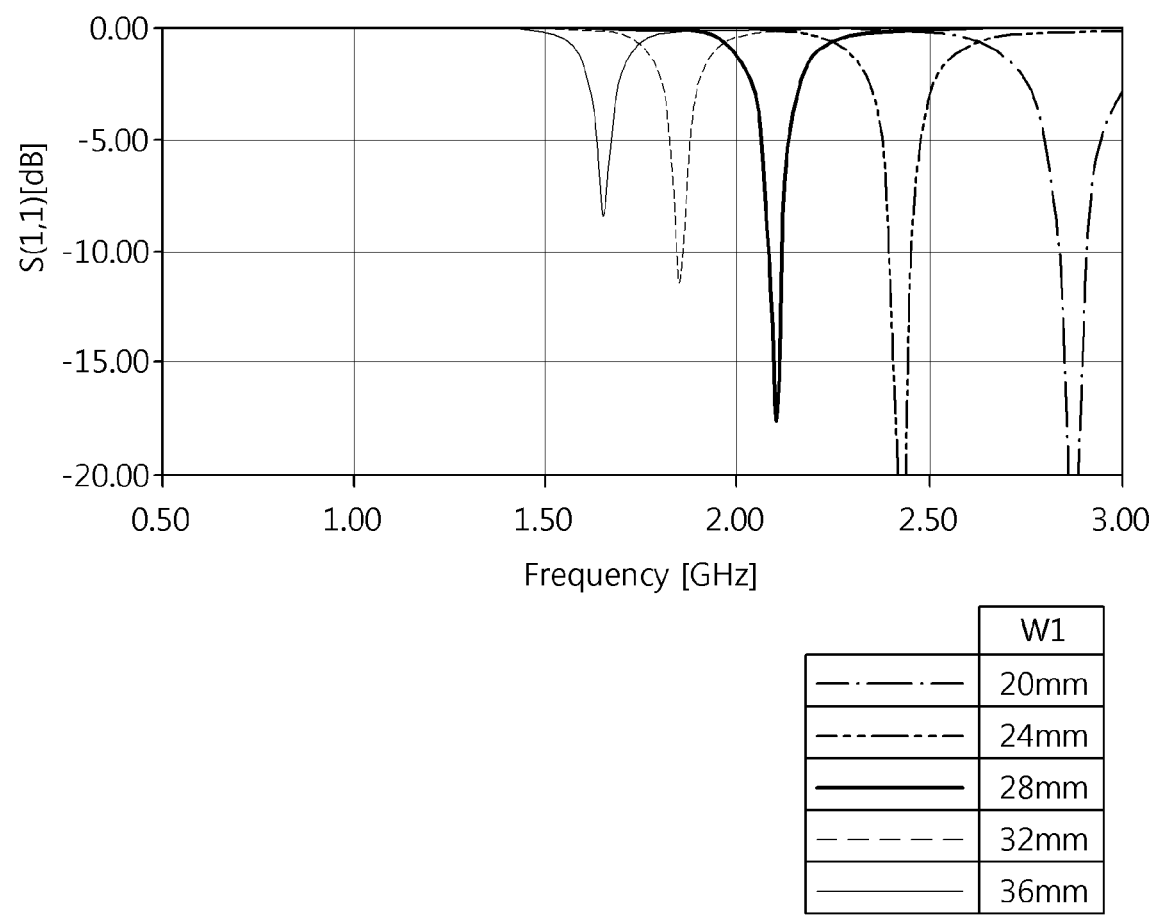
FIG. 9 is a graph illustrating a ratio of an output voltage to an input voltage in a frequency distribution according to a first width of a slot of the antenna in FIG. 7 according to an embodiment of the disclosure.

FIG. 9 is a graph illustrating a ratio of an output voltage to an input voltage in a frequency distribution according to a first width W1 of a slot of the antenna in FIG. 7 according to an embodiment of the disclosure.

Referring to FIGS. 7 and 9, for example, a physical length of the sixth antenna radiator ⑥ and an electrical length (electrical path) thereof (e.g., a length expressed as a ratio of a wavelength) may vary depending on the first width W1 of the slot 710. According to the embodiment, as the first width W1 of the slot 710 increases, the resonant frequency corresponding to the electrical length may move to a low frequency. According to the embodiment, according to the embodiment in FIG. 7, the sixth antenna radiator ⑥, which operates in IFA based on the slot 710, may have an electrical length of about λ/4. The physical length of the sixth antenna radiator ⑥ and the electrical length thereof may also vary depending on the second width W2 of the slot 710. The shape of the slot 710 (e.g., the first width W1 or the second width W2) may be variously implemented to implement the sixth antenna radiator ⑥ and the electrical length thereof for forming an electromagnetic field for transmitting and/or receiving at least one signal of a preset or designated frequency band.

Figure 10:
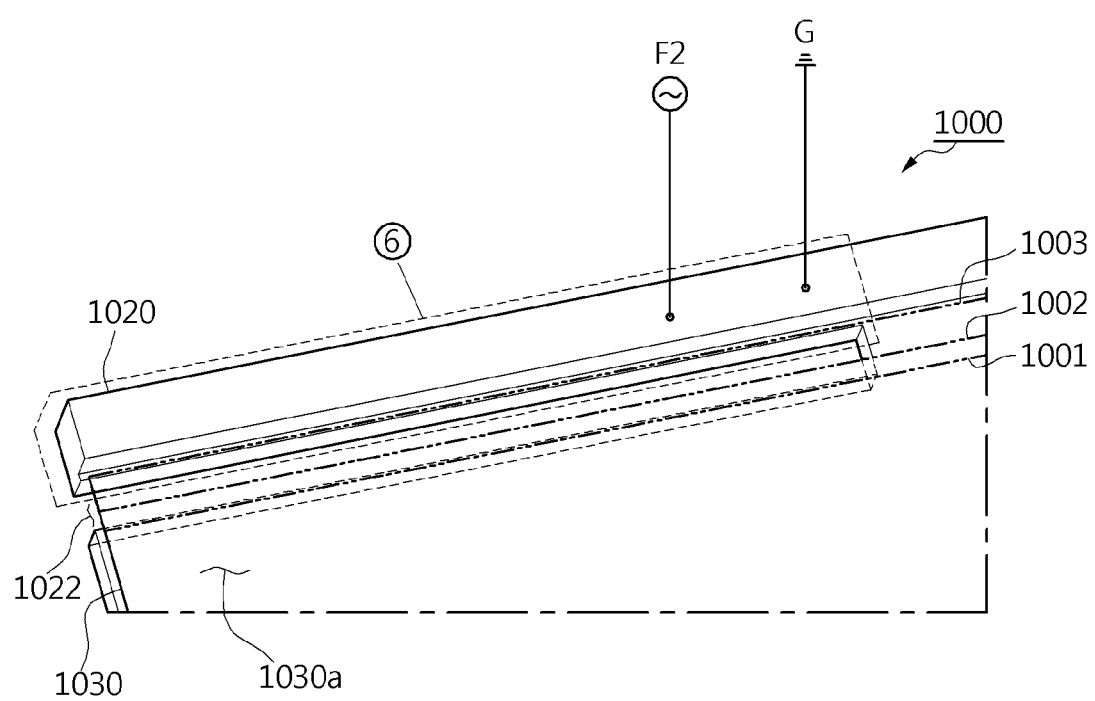
FIG. 10 is a view schematically illustrating an antenna according to an embodiment of the disclosure.
Figure 11:
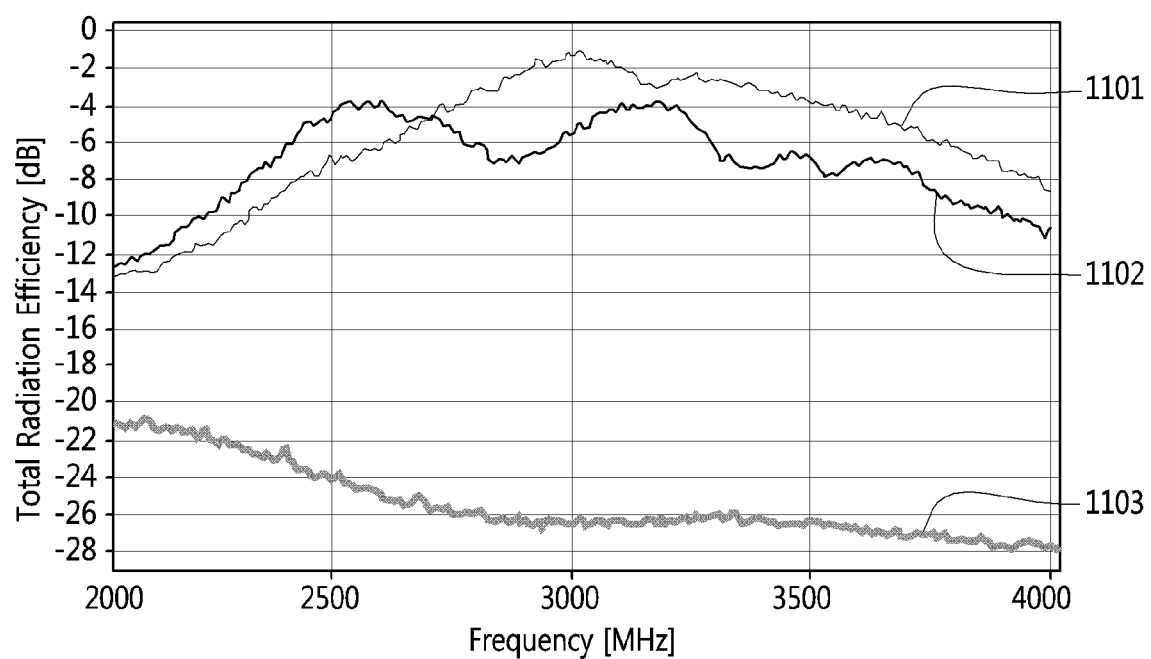
FIG. 11 is a graph illustrating antenna radiation performance in a frequency distribution related to the antenna in FIG. 10 according to an embodiment of the disclosure.

FIG. 10 schematically illustrates an antenna according to an embodiment of the disclosure. FIG. 11 is a graph illustrating antenna radiation performance related to the antenna in FIG. 10 according to an embodiment of the disclosure.

Referring to FIG. 10, in the embodiment, an antenna 1000 may include the sixth antenna radiator ⑥ defined by a part of a display support structure 1020, and a feeding unit F2 and a ground G electrically connected to the sixth antenna radiator ⑥. The sixth antenna radiator ⑥ may include a part of the display support structure 1020 at the periphery of a slot 1022 (e.g., the slot 710 in FIG. 7) formed in the display support structure 1020. Although not illustrated, a non-conductive member may be disposed in the slot 1022 by injection molding or the like. FIG. 10 illustrates an embodiment in which a planar portion 1030a is expanded while substituting for the first curved portion 230b in FIG. 7. Therefore, a support portion (e.g., the support portion 2202 in FIG. 7) of the display support structure 1020 may be formed to be flat while corresponding to the planar portion 1030a.

According to the embodiment, reference numeral '1001' indicates a first case in which the planar portion 1030a of a flexible display 1030 does not overlap the slot 1022 of the display support structure 1020 when viewed from above the planar portion 1030a. Reference numeral '1002' indicates a second case in which the planar portion 1030a of the flexible display 1030 at least partially overlaps the slot 1022 of the display support structure 1020 when viewed from above the planar portion 1030a. Reference numeral '1003' indicates a third case in which the planar portion 1030a of the flexible display 1030 overlaps the entire slot 1022 of the display support structure 1020 when viewed from above the planar portion 1030a. In the embodiment, the planar portion 1030a may be a part including a lower panel (e.g., the lower panel 802 in FIG. 8). For example, the lower panel 830 may include a blocking conductive sheet (e.g., the blocking conductive sheet 833b in FIG. 8).

Referring to FIG. 11, reference numeral '1101' indicates antenna radiation performance related to the first case or a case in which the flexible display 1030 does not overlap the antenna 1000. Reference numeral '1102' indicates antenna radiation performance related to the second case. Reference numeral '1103' indicates antenna radiation performance related to the third case. With reference to the comparison between the graphs indicated by reference numerals '1101,' '1102,' and '1103', the antenna radiation performance deteriorates by about 2 dB in the second case in comparison with the first case, for example, but the second case have efficiency of about −6 dB or more that is an antenna performance ensuring level. For example, in the third case, it may be difficult to ensure the antenna performance in comparison with the first case or the second case. As a degree to which the planar portion 1030a of the flexible display 1030 overlaps the slot 1022 of the display support structure 1020 increases, it is more difficult to ensure the antenna radiation performance. For example, as a degree to which the planar portion 1030a of the flexible display 1030 overlaps the slot 1022 of the display support structure 1020 increases, a degree to which a conductive material (e.g., the EMI blocking conductive sheet 833b in FIG. 8) included in the flexible display 1030 overlaps the slot 1022 may increase, and a spacing distance between the conductive material and the sixth antenna radiator ⑥ may decrease. Therefore, as the degree to which the planar portion 1030a of the flexible display 1030 overlaps the slot 1022 of the display support structure 1020 increases, an influence applied to the sixth antenna radiator ⑥ by the conductive material included in the flexible display 1030 may increase.

According to the embodiment, in comparison with the embodiment in FIG. 10, the embodiment in FIG. 7 or 8 may be more advantageous in increasing, by the first curved portion 230b, a distance from the sixth antenna radiator ⑥ while decreasing the degree to which the conductive material (e.g., the EMI blocking conductive sheet 833b in FIG. 8) included in the flexible display 230 overlaps the slot 710.

According to any embodiment, in the second case (see reference numeral '1002') or the third case (see reference numeral '1003'), the EMI blocking conductive sheet included in the flexible display 1030 may be implemented to include an opening that at least partially overlaps the sixth antenna radiator ⑥ when viewed from above the planar portion 1030a. The opening of the EMI blocking conductive sheet may have a shape (e.g., size) to reduce an electromagnetic influence applied to the sixth antenna radiator ⑥ at a level at which the EMI blocking performance may be ensured.

Figure 12:
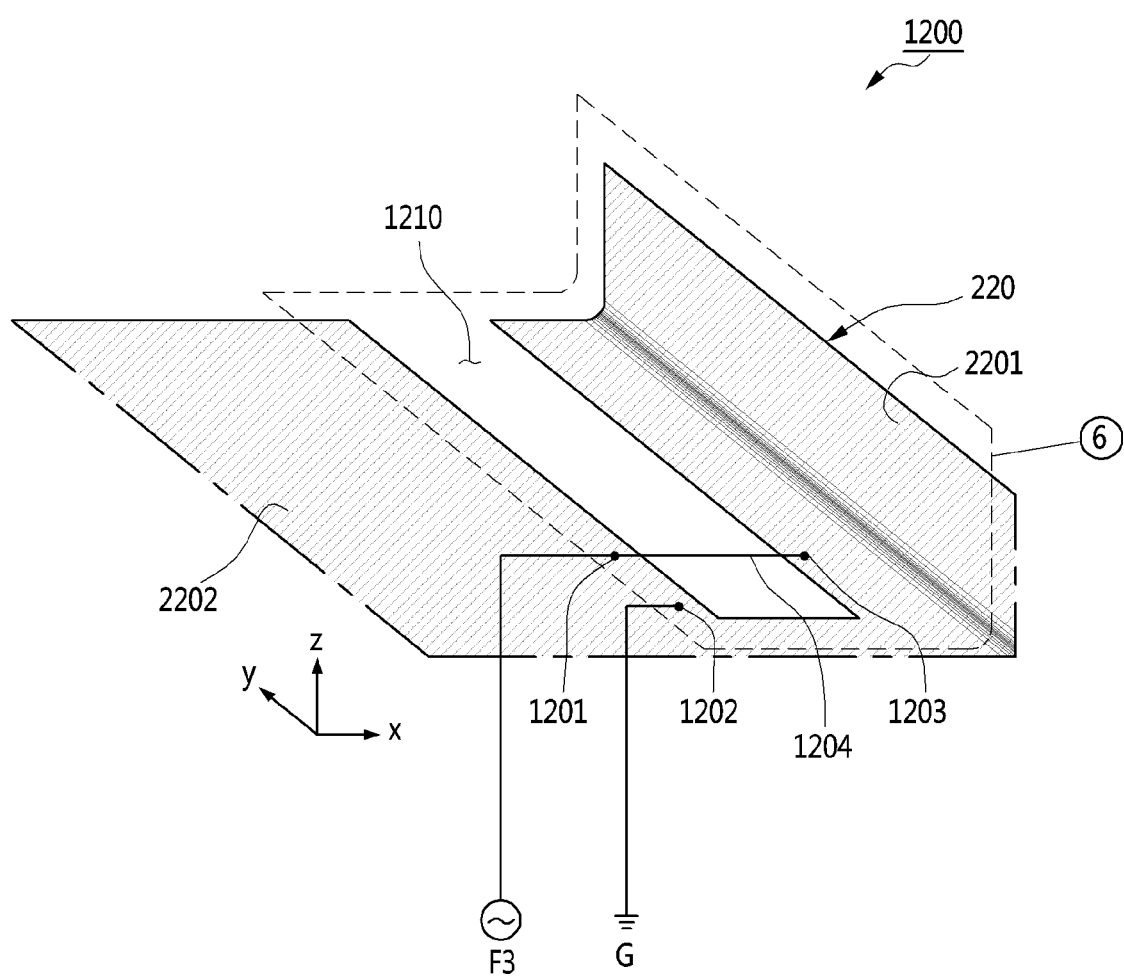
FIG. 12 is a view schematically illustrating an antenna according to an embodiment of the disclosure.

FIG. 12 schematically illustrates an antenna according to an embodiment of the disclosure.

Referring to FIG. 12, in the embodiment, an antenna 1200 may include the sixth antenna radiator ⑥ defined by a part of the display support structure 220, and a feeding unit F3 and a ground G electrically connected to the sixth antenna radiator ⑥. According to the embodiment, the sixth antenna radiator ⑥ may include at least a part of the display support structure 220 that surrounds a slot 1210 (e.g., the slot 710 in FIG. 7) formed in the display support structure 220. A repeated description of some of the reference numerals in FIG. 12 will be omitted.

According to the embodiment, for example, a feeding point 1201 of the sixth antenna radiator ⑥ electrically connected to the feeding unit F3 and a grounding point 1202 of the sixth antenna radiator ⑥ electrically connected to the ground G may be positioned opposite to the third rim portion 2201 with the slot 1210 interposed therebetween. The antenna 1200 may include an electrical path 1204 that electrically connects one position (e.g., the feeding point 1201) and another position 1203 of the sixth antenna radiator ⑥ while traversing the slot 1210. The antenna 1200 may radiate radio waves by supplying power to the sixth antenna radiator ⑥ of the display support structure 220. A part of the display support structure 220 including the slot 1210 may serve as the sixth antenna radiator ⑥ by a potential difference between the feeding point (feeding point) 1201 of the sixth antenna radiator ⑥, which is electrically connected to the feeding unit F3 and is a point having the maximum radiation current, and the grounding point (grounding point) 1202 of the sixth antenna radiator ⑥ electrically connected to the ground G. According to the embodiment, the sixth antenna radiator ⑥ may operate as an IFA (inverted F antenna). The positions or number of the feeding point 1201 or the grounding point 1202 may be variously implemented without being limited to the embodiment in FIG. 12.

Figure 13A:
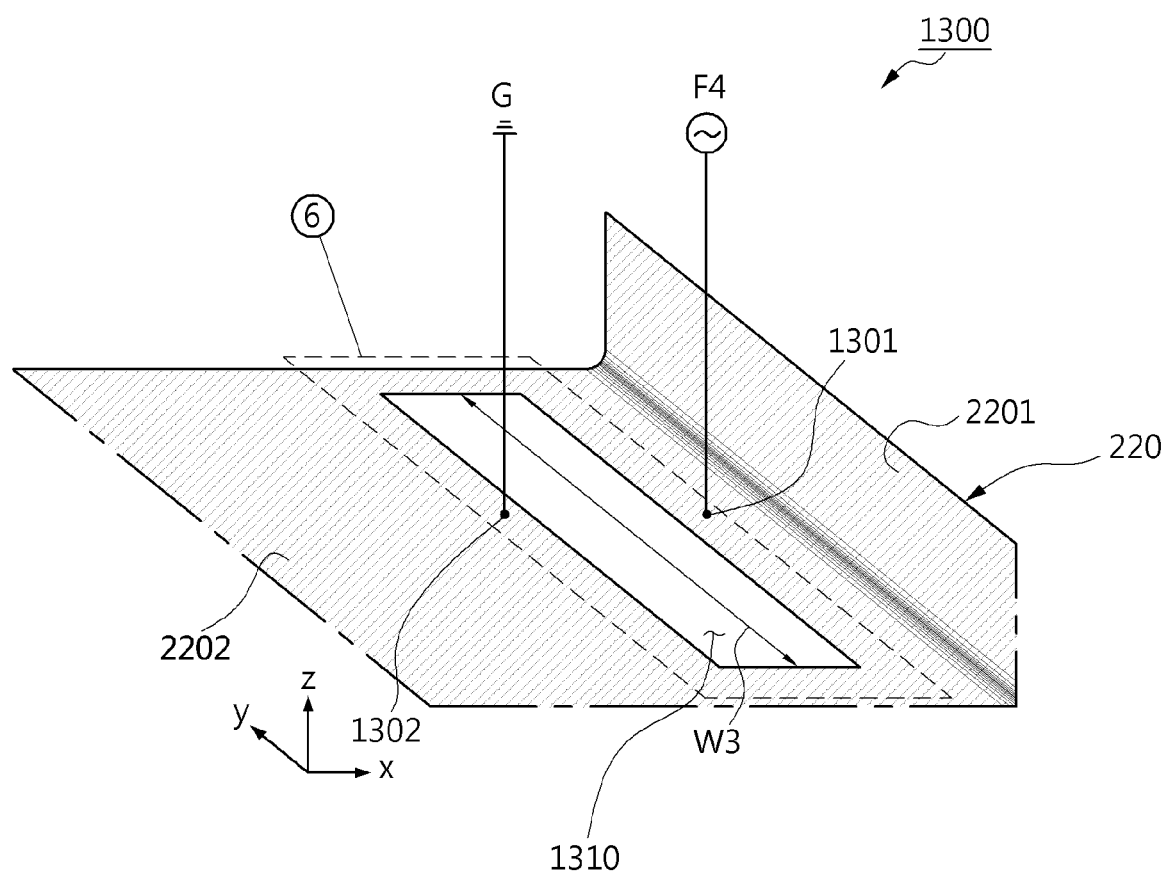
FIG. 13A is a view schematically illustrating an antenna according to an embodiment of the disclosure.

FIG. 13A schematically illustrates an antenna according to an embodiment of the disclosure.

Referring to FIG. 13A, in the embodiment, an antenna 1300 may include the sixth antenna radiator ⑥ defined by a part of the display support structure 220, and a feeding unit F4 and a ground G electrically connected to the sixth antenna radiator ⑥. A repeated description of some of the reference numerals in FIG. 13A will be omitted.

In comparison with the slot 1210 according to the embodiment in FIG. 12, a slot 1310 formed in the display support structure 220 according to the embodiment may have a shape in which the entire slot 1310 is surrounded by the display support structure 220. The sixth antenna radiator ⑥ may include at least a part of the display support structure 220 that surrounds the slot 1310 of the display support structure 220. According to the embodiment, a feeding point 1301 of the sixth antenna radiator ⑥ electrically connected to the feeding unit F4 and a grounding point 1302 of the sixth antenna radiator ⑥ electrically connected to the ground G may be positioned opposite to each other with the slot 1310 interposed therebetween. The antenna 1300 may radiate radio waves by supplying power to the sixth antenna radiator ⑥ of the display support structure 220. A part of the display support structure 220 including the slot 1310 may serve as the sixth antenna radiator ⑥ by a potential difference between the feeding point (feeding point) 1301 of the sixth antenna radiator ⑥, which is electrically connected to the feeding unit F4 and is a point having the maximum radiation current, and the grounding point (grounding point) 1302 of the sixth antenna radiator ⑥ electrically connected to the ground G. According to the embodiment, the sixth antenna radiator ⑥ may operate as a slot antenna or a slit antenna.

Referring to FIGS. 12 and 13A, in the embodiment, an electrical length (e.g., a length expressed as a ratio of a wavelength) of the slot 1210 or 1310 may substantially affect frequency characteristics of the antenna 1200 or 1300. According to the embodiment, the sixth antenna radiator ⑥ in FIG. 12, which operates in IFA based on the slot 1210, may have an electrical length of about λ/4. According to the embodiment, the sixth antenna radiator ⑥ in FIG. 13A, which operates as a slot antenna based on the slot 1310, may have an electrical length of about λ/2.

Figure 13B:
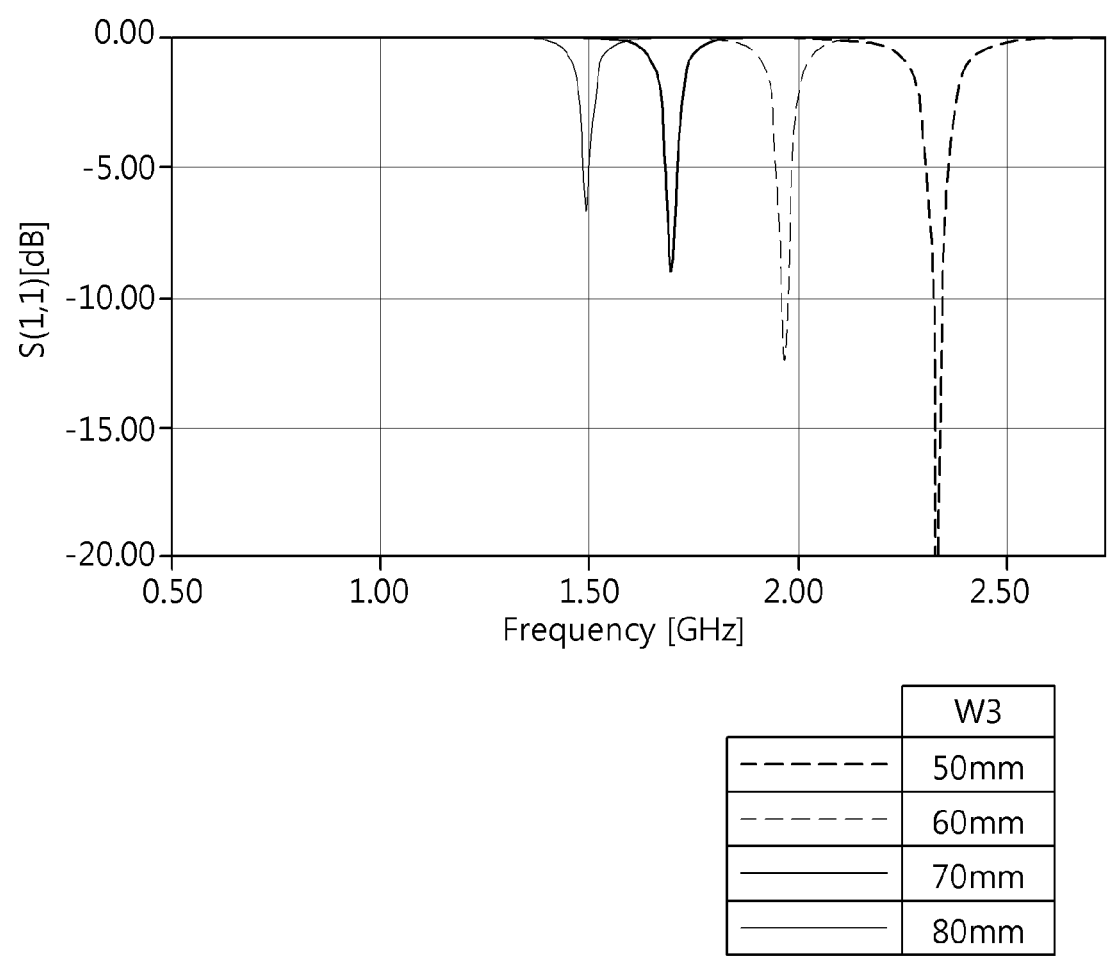
FIG. 13B is a graph illustrating a ratio of an output voltage to an input voltage in a frequency distribution according to a width by which a slot extends in a y-axis direction in the antenna in FIG. 13A according to an embodiment of the disclosure.

FIG. 13B is a graph illustrating a ratio of an output voltage to an input voltage in a frequency distribution according to a width W3 by which the slot extends in the y-axis direction in the antenna in FIG. 13A according to an embodiment of the disclosure.

Referring to FIGS. 13A and 13B, for example, a physical length of the sixth antenna radiator ⑥ and an electrical length thereof may vary depending on the width W3 of the slot 1310. According to the embodiment, as the width W3 of the slot 1310 increases, the resonant frequency corresponding to the electrical length may move to a low frequency. According to various embodiments, although not illustrated, the physical size of the sixth antenna radiator ⑥ and the electrical length thereof may also vary depending on a width of the slot 1310 extending in another direction (e.g., the x-axis direction). According to the embodiment, the shape of the slot 1310 may be variously implemented to implement the sixth antenna radiator ⑥ and the electrical length thereof for forming an electromagnetic field for transmitting and/or receiving a signal of a preset or designated frequency band.

Referring to FIGS. 12 and 13A, in various embodiments, the flexible display 230 (see FIG. 7 or 10) may be disposed on the support structure 220 to reduce an influence applied to the antenna radiation performance of the sixth antenna radiator ⑥. For example, the EMI blocking conductive sheet (e.g., the EMI blocking conductive sheet 833b in FIG. 8) included in the flexible display 230 may be disposed to be spaced apart from the sixth antenna radiator ⑥ at a level at which the antenna radiation performance of the sixth antenna radiator ⑥ may be ensured. For example, the EMI blocking conductive sheet 833b included in the flexible display 230 may be disposed so as not to substantially overlap the slot 1210 or 1310 of the display support structure 220 or the sixth antenna radiator ⑥ to ensure the antenna radiation performance when viewed in the −z direction. As another example, the EMI blocking conductive sheet included in the flexible display 230 may be implemented to include an opening that at least partially overlaps the slot 1210 or 1310 of the display support structure 220 when viewed in the −z direction. In the embodiment, the opening of the EMI blocking conductive sheet may have a shape (e.g., size) to reduce an electromagnetic influence applied to the sixth antenna radiator ⑥ at a level at which the EMI blocking performance may be ensured.

According to various embodiments, the support sheet 470 in FIG. 4 may include a metallic material and extend between the display support structure 220 and the flexible display 230 (see FIGS. 7 and 10). The support sheet 470 may be implemented to reduce an electromagnetic influence applied to the sixth antenna radiator ⑥ in substantially the same way as the EMI blocking conductive sheet.

Figure 14A:
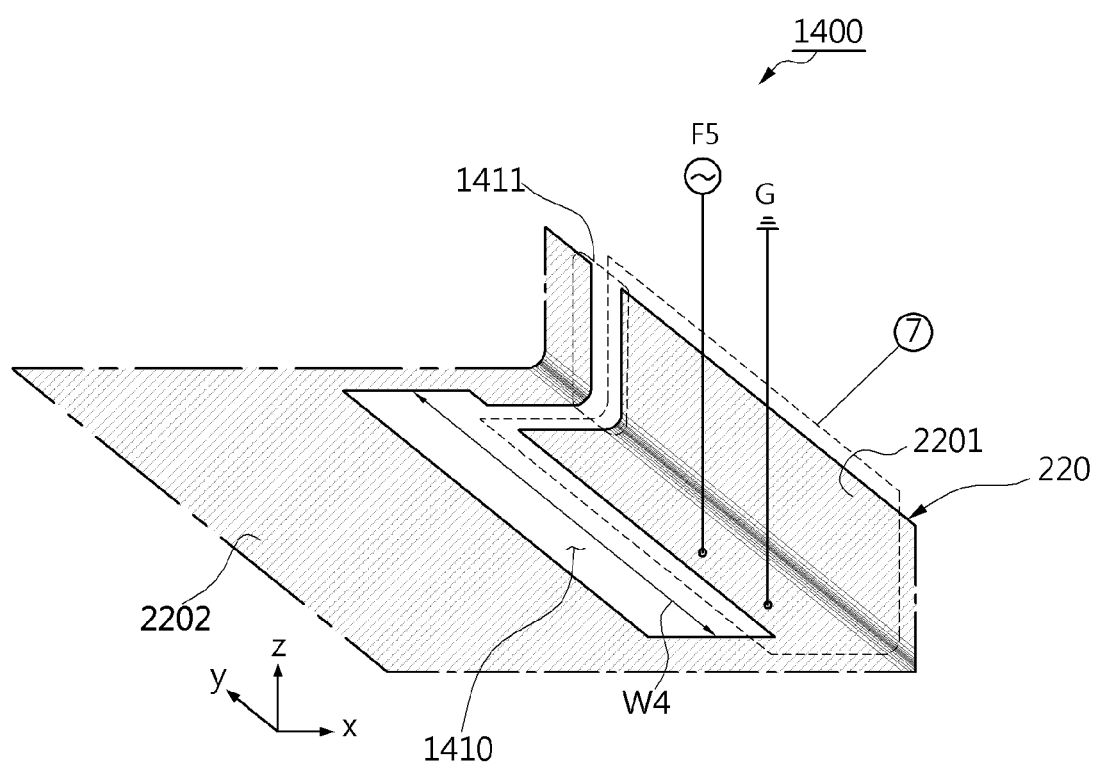
FIG. 14A is a view schematically illustrating an antenna related to a seventh antenna radiator in the electronic device in FIG. 5 according to an embodiment of the disclosure.

FIG. 14A schematically illustrates an antenna related to the seventh antenna radiator ⑦ in the electronic device in FIG. 5 according to an embodiment of the disclosure.

Referring to FIG. 14A, in the embodiment, an antenna 1400 may include the seventh antenna radiator ⑦ defined by a part of the display support structure 220, and a feeding unit F5 and a ground G electrically connected to the seventh antenna radiator ⑦. The display support structure 220 may include the third rim portion 2201 (see FIG. 2A or 3A), and a support portion 2202 extending from the third rim portion 2201 and facing the first area ⓐ of the flexible display 230 (see FIG. 7). In FIG. 14A, the third rim portion 2201 and the support portion 2202 are schematically illustrated to understand the antenna 1400, but the third rim portion 2201 and the support portion 2202 may be implemented in a form that may protect and support the flexible display 230. A repeated description of some of the reference numerals in FIG. 14A will be omitted.

According to the embodiment, the display support structure 220 may include another slot 1411 formed in the third rim portion 2201. A slot 1410 formed in the display support structure 220 may be connected to the other slot 1411. According to various embodiments, a non-conductive member (not illustrated) may be disposed on the slot 1410 and/or the other slot 1411. For example, a part of the non-conductive member may be disposed in the other slot 1411 and define a part of the outer surface of the electronic device 200 (see FIG. 2A). The seventh antenna radiator ⑦ is a part of the display support structure 220 at the periphery of the slot 1410 and the other slot 1411 and may form an electromagnetic field capable of transmitting and/or receiving a signal with at least one frequency when the radiation current is provided from the feeding unit F5 to the display support structure 220. The display support structure 220 may be electrically connected to the ground G (e.g., the ground plane included in the printed circuit board 490 in FIG. 4). Therefore, the seventh antenna radiator ⑦ may be kept electrically connected to the ground G. The slot 1410 may contribute to allowing the display support structure 220 to implement the seventh antenna radiator ⑦ for a path through which the radiation current flows and/or a distribution of the radiation current when the radiation current is provided to the feeding unit F5. With the slot 1410, the display support structure 220 may include a part that operates as the seventh antenna radiator ⑦, and a part (not illustrated) that is electrically connected to the ground G and operates as the antenna ground. According to the embodiment, the seventh antenna radiator ⑦ may operate as an IFA (inverted F antenna). The position or shape of the slot 1410 and the position or shape of the seventh antenna radiator ⑦ may be variously implemented based on a frequency of a signal to be transmitted and/or received without being limited to the embodiment in FIG. 14A. According to various embodiments (not illustrated), like the embodiment in FIG. 12 13A, or 13B, the antenna 1400 may be implemented to include the ground G, a feeding unit F5, or the seventh antenna radiator ⑦ that operates as a loop antenna, a slit antenna, a slot antenna, or an open slot antenna.

Figure 14B:
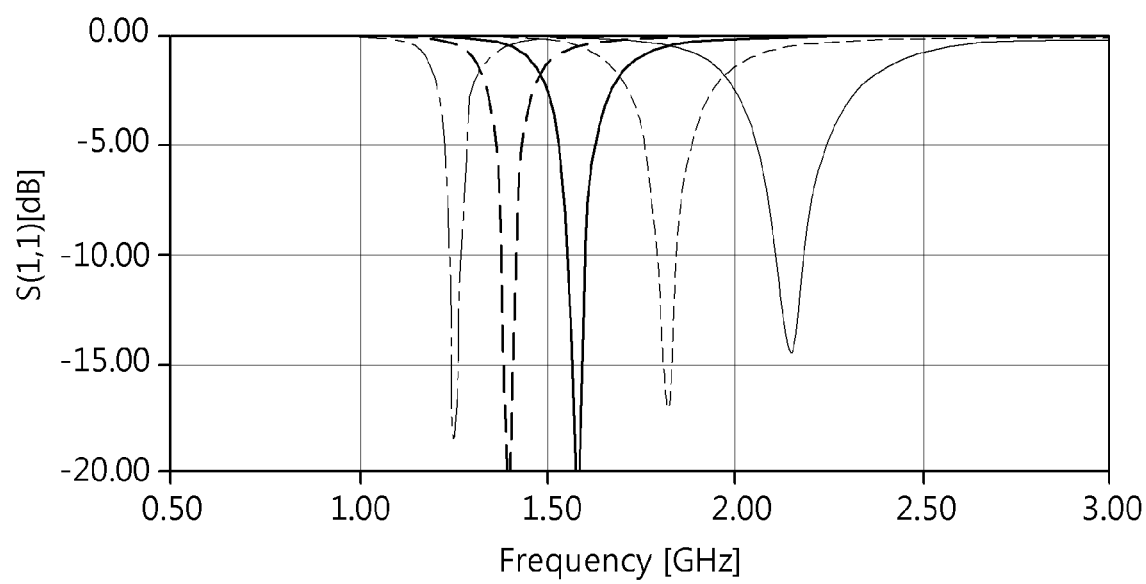
FIG. 14B is a graph illustrating a ratio of an output voltage to an input voltage in a frequency distribution according to a width by which a portion formed on a support portion in an opening extends in the y-axis direction in the antenna in FIG. 14A according to an embodiment of the disclosure.

FIG. 14B is a graph illustrating a ratio of an output voltage to an input voltage in a frequency distribution according to a width W4 by which a portion formed on a support portion (e.g., support portion 2202) in a slot (e.g., slot 1410) extends in the y-axis direction in the antenna illustrated in FIG. 14A according to an embodiment of the disclosure.

Referring to FIGS. 14A and 14B, for example, a physical size of the seventh antenna radiator ⑦ and an electrical length thereof may vary depending on the width W4 of the slot 1410. According to the embodiment, as the width W4 of the slot 1410 increases, the resonant frequency corresponding to the electrical length may move to a low frequency. For example, when the width W4 of the slot 1410 is about 25 mm, the antenna 1400 may resonate at about 2.3 GHz. When the width W4 is larger than 25 mm, the antenna may resonate at a frequency smaller than about 2.3 GHz. According to various embodiments, although not illustrated, the physical size of the seventh antenna radiator ⑦ and the electrical length thereof may vary depending on a width of the slot 1410 in another direction (e.g., the x-axis direction). The shape of the slot 1410 may be variously implemented to implement the seventh antenna radiator ⑦ and the electrical length thereof for forming an electromagnetic field for transmitting and/or receiving a signal of a preset or designated frequency band. According to the embodiment, the antenna 1400 may be implemented to transmit and/or receive at least one signal in a band with a frequency of about 600 MHz to about 6 GHz.

Figure 15:
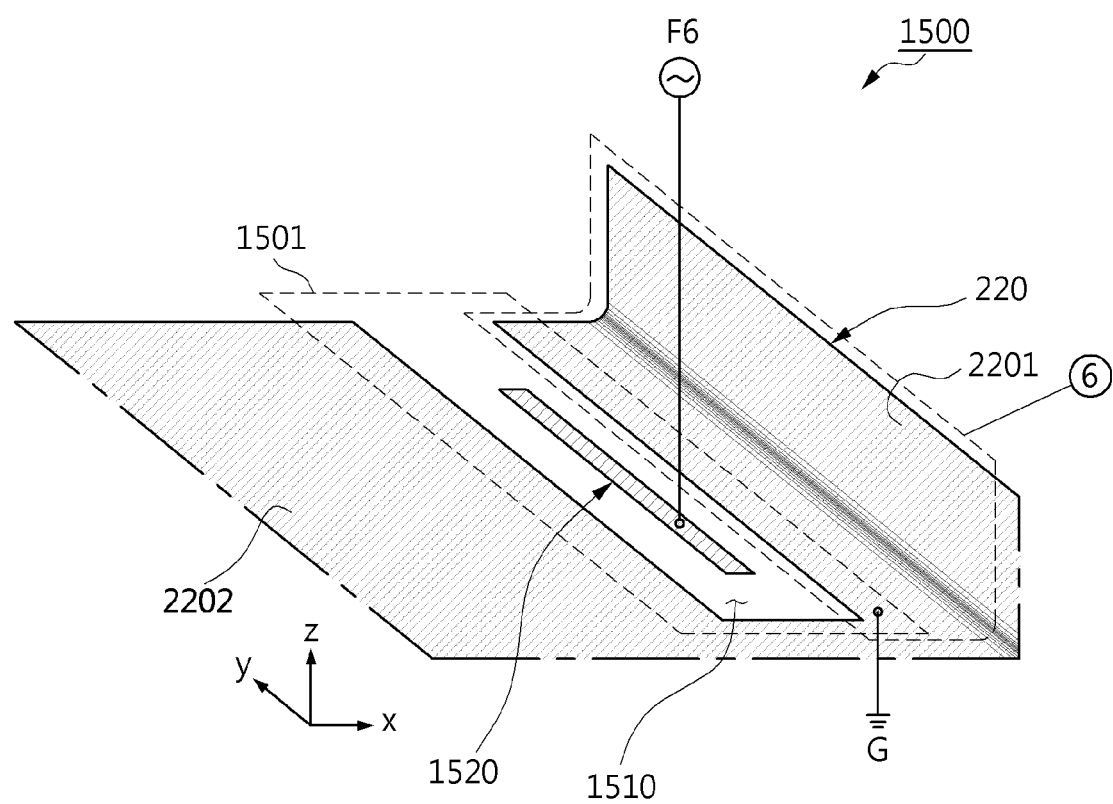
FIG. 15 is a view schematically illustrating an antenna related to a sixth antenna radiator in the electronic device in FIG. 5 according to an embodiment of the disclosure.

FIG. 15 schematically illustrates an antenna related to a sixth antenna radiator ⑥ in the electronic device in FIG. 5 according to an embodiment of the disclosure.

Referring to FIG. 15, in the embodiment, an antenna 1500 may include the sixth antenna radiator ⑥ defined by a part of the display support structure 220, and a feeding unit F6, and a ground G, or a conductive pattern 1520. The sixth antenna radiator ⑥ may be implemented based on a slot 1510 (e.g., the slot 710 in FIG. 7) formed in the display support structure 1020. A repeated description of some of the reference numerals in FIG. 15 will be omitted.

According to the embodiment, the conductive pattern 1520 may be disposed in the slot 1510 or positioned to at least partially overlap the slot 1510 when viewed in the z-axis direction. For example, the non-conductive member (not illustrated) may be disposed in the slot 1510 of the display support structure 220 by injection molding or the like. The conductive pattern 1520 may be disposed on the non-conductive member or in the non-conductive member. The conductive pattern 1520 may be disposed to be physically separated from the sixth antenna radiator ⑥.

According to the embodiment, the conductive pattern 1520 may be electrically connected to the feeding unit F6. A part of the display support structure 220 electrically connected to the ground G may be supplied with power indirectly from the conductive pattern 1520 and operate as the sixth antenna radiator ⑥. For example, the electromagnetic coupling between the conductive pattern 1520 and the sixth antenna radiator ⑥ may allow the antenna 1500 to form an electromagnetic field capable of transmitting and/or receiving at least one signal with in the corresponding frequency band. According to another embodiment, like reference numeral '1501', the sixth antenna radiator ⑥ may include at least a part of the display support structure 220 that surrounds the slot 1510. A part of the display support structure 220, which is supplied with power indirectly from the conductive pattern 1520 and operates as the sixth antenna radiator ⑥, may be variously implemented based on the slot 1510 without being limited to the embodiment in FIG. 15. According to various embodiments, the slot 1510 may be formed in the same way as the slot 1310 according to the embodiment in FIG. 13A.

According to various embodiments, the structure for indirectly supplying power to the sixth antenna radiator ⑥ according to the embodiment in FIG. 15 may be applied to the antenna 1400 in FIG. 14A related to the seventh antenna radiator ⑦.

In various embodiments, the flexible display 230 (see FIG. 7 or 10) may be disposed on the display support structure 220 to reduce an influence applied to the antenna radiation performance of the sixth antenna radiator ⑥. For example, the EMI blocking conductive sheet (e.g., the EMI blocking conductive sheet 833b in FIG. 8) included in the flexible display 230 may be disposed to be spaced apart from the sixth antenna radiator ⑥ at a level at which the antenna radiation performance of the sixth antenna radiator ⑥ may be ensured. For example, the EMI blocking conductive sheet included in the flexible display 230 may be disposed so as not to substantially overlap the slot 1510, the conductive pattern 1520, or the sixth antenna radiator ⑥ to ensure the antenna radiation performance when viewed in the −z direction. As another example, the EMI blocking conductive sheet included in the flexible display 230 may be disposed to partially overlap the slot 1510 or the conductive pattern 1520 when viewed in the −z direction at a level at which the antenna radiation performance may be ensured. As another example, the EMI blocking conductive sheet included in the flexible display 230 may be implemented to include an opening that at least partially overlaps the slot 1510 or the conductive pattern 1520 when viewed in the −z direction. The opening of the EMI blocking conductive sheet may have a shape (e.g., size) to reduce an electromagnetic influence applied to the sixth antenna radiator ⑥ at a level at which the EMI blocking performance may be ensured. According to various embodiments, the support sheet 470 in FIG. 4 may include a metallic material and extend between the display support structure 220 and the flexible display 230 (see FIGS. 7 and 10). The support sheet 470 may be implemented to reduce an electromagnetic influence applied to the sixth antenna radiator ⑥ in substantially the same way as the EMI blocking conductive sheet.

Figure 16:
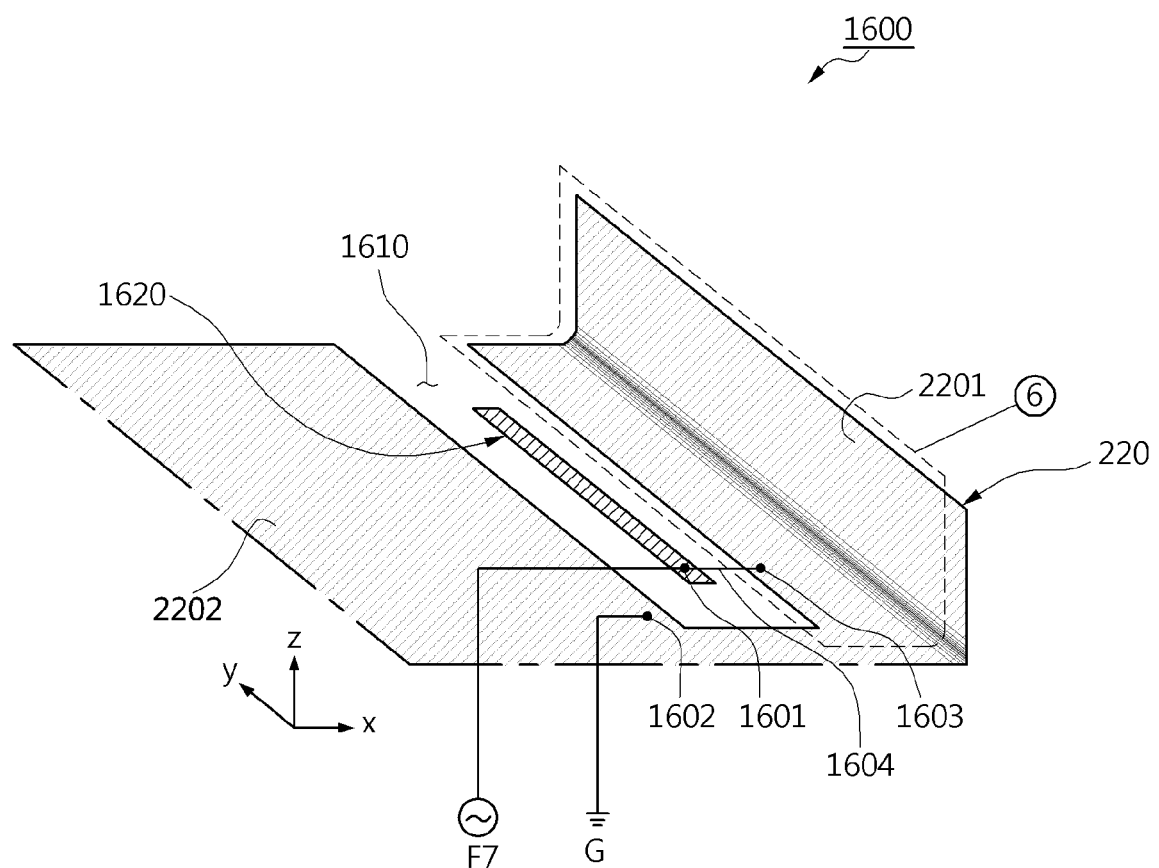
FIG. 16 is a view schematically illustrating an antenna related to a sixth antenna radiator in the electronic device in FIG. 5 according to an embodiment of the disclosure.

FIG. 16 schematically illustrates an antenna related to a sixth antenna radiator ⑥ in the electronic device in FIG. 5 according to an embodiment of the disclosure.

Referring to FIG. 16, in the embodiment, an antenna 1600 may include the sixth antenna radiator ⑥ defined by a part of the display support structure 220, and a feeding unit F7, and a ground G, or a conductive pattern 1620. The feeding unit F7, the ground G, and the conductive pattern 1620 may be electrically connected to the sixth antenna radiator ⑥. The sixth antenna radiator ⑥ may be implemented based on a slot 1610 (e.g., the slot 710 in FIG. 7) formed in the display support structure 1020. A repeated description of some of the reference numerals in FIG. 16 will be omitted.

According to the embodiment, the conductive pattern 1620 may be electrically connected to the sixth antenna radiator ⑥. The conductive pattern 1620 may be disposed in the slot 1610 or positioned to at least partially overlap the slot 1610 when viewed in the z-axis direction. For example, the non-conductive member (not illustrated) may be disposed in the slot 1610 of the display support structure 220 by injection molding or the like. The conductive pattern 1620 may be disposed on the non-conductive member or in the non-conductive member. The conductive pattern 1620, together with the sixth antenna radiator ⑥ electrically connected to the feeding unit F7, may operate as an additional antenna radiator. According to various embodiments, the conductive pattern 1620 of the antenna 1600 may form at least one additional resonant frequency.

According to various embodiments (not illustrated), unlike the embodiment in FIG. 15, the feeding unit F7 may also be electrically connected to the conductive pattern 1620. According to the embodiment, the sixth antenna radiator ⑥ may include a protrusion formed toward the slot 1610. The protrusion may be connected to the conductive pattern 1620 and electrically connected to the wireless communication circuit (e.g., the wireless communication circuit 540 in FIG. 5). According to the embodiment, a feeding point at one position 1601 of the sixth antenna radiator ⑥ electrically connected to the feeding unit F7 may be positioned on the conductive pattern 1620. The antenna 1600 may include an electrical path 1604 that electrically connects one position 1601 of the conductive pattern 1620 and one position (see reference number '1603') of the sixth antenna radiator ⑥. According to the embodiment, for example, the one position 1603 electrically connected to the feeding unit F7 and a ground point 1602 of the sixth antenna radiator ⑥ electrically connected to the ground G may be positioned opposite to the third rim portion 2201 with the slot 1610 interposed therebetween.

According to the embodiment, the single feeding unit F7 may simultaneously supply power to the (or both the) conductive pattern 1620 and the sixth antenna radiator ⑥, and thus two resonant frequencies may be formed.

According to the embodiment, the conductive pattern 1620 may be implemented as an FPCB. According to another embodiment, the display support structure 220 may be implemented to include the conductive pattern 1620.

According to various embodiments, the structure including the conductive pattern 1620 according to the embodiment in FIG. 16 may also be applied to the antenna 1400 in FIG. 14A related to the seventh antenna radiator ⑦. For example, the conductive pattern (e.g., the conductive pattern 1620 in FIG. 16) may be disposed in the slot 1410, and the conductive pattern may be electrically connected to the seventh antenna radiator ⑦. The conductive pattern and the seventh antenna radiator ⑦ may be electrically connected to the wireless communication circuit at the same position. For example, the conductive pattern and the seventh antenna radiator ⑦ may be identical in feeding point to each other.

In various embodiments, the flexible display 230 (see FIG. 7 or 10) may be disposed on the display support structure 220 to reduce an influence applied to the antenna radiation performance of the sixth antenna radiator ⑥. For example, the EMI blocking conductive sheet (e.g., the EMI blocking conductive sheet 833b in FIG. 8) included in the flexible display 230 may be disposed to be spaced apart from the sixth antenna radiator ⑥ and the conductive pattern 1620 at a level at which the antenna radiation performance of the sixth antenna radiator ⑥ may be ensured. For example, the EMI blocking conductive sheet included in the flexible display 230 may be disposed so as not to substantially overlap the slot 1610, the conductive pattern 1620, or the sixth antenna radiator ⑥ to ensure the antenna radiation performance when viewed in the −z direction. As another example, the EMI blocking conductive sheet included in the flexible display 230 may be disposed to partially overlap the slot 1610 or the conductive pattern 1620 when viewed in the −z direction at a level at which the antenna radiation performance may be ensured. As another example, the EMI blocking conductive sheet included in the flexible display 230 may be implemented to include an opening that at least partially overlaps the slot 1610 or the conductive pattern 1620 when viewed in the −z direction. The opening of the EMI blocking conductive sheet may have a shape (e.g., size) to reduce an electromagnetic influence applied to the sixth antenna radiator ⑥ and/or the conductive pattern 1620 at a level at which the EMI blocking performance may be ensured. According to various embodiments, the support sheet 470 in FIG. 4 may include a metallic material and extend between the display support structure 220 and the flexible display 230 (see FIGS. 7 and 10). The support sheet 470 may be implemented to reduce an electromagnetic influence applied to the sixth antenna radiator ⑥ and/or the conductive pattern 1620 in substantially the same way as the EMI blocking conductive sheet.

Figure 17:
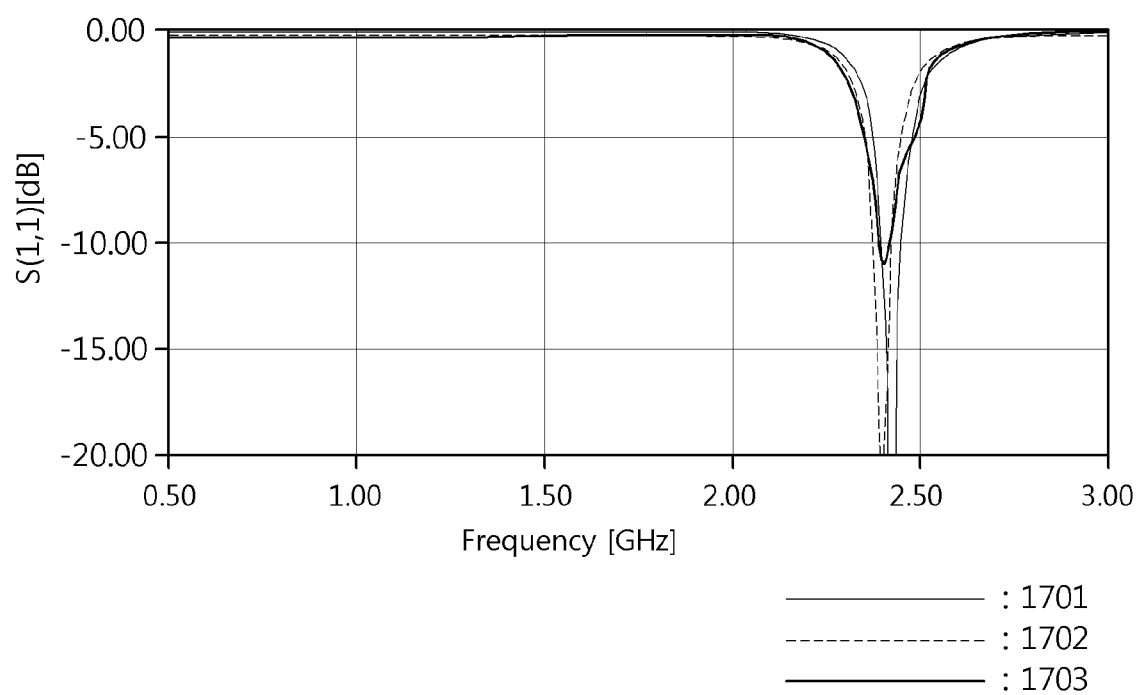
FIG. 17 is a graph illustrating a ratio of an output voltage to an input voltage in a frequency distribution related to the antenna in FIG. 7, the antenna in FIG. 15, and the antenna in FIG. 16 according to an embodiment of the disclosure.

FIG. 17 is a graph illustrating a ratio of an output voltage to an input voltage in a frequency distribution related to the antenna in FIG. 7, the antenna in FIG. 15, and the antenna in FIG. 16 according to an embodiment of the disclosure.

Referring to FIG. 17, in the embodiment, reference numeral '1701' is related to the antenna 700 in FIG. 7, reference numeral '1702' is related to the antenna 1500 in FIG. 15, and reference numeral '1703' is related to the antenna 1600 in FIG. 16. With reference to the graphs indicated by reference numerals '1701,' '1702,' and '1703', the antenna 700 in FIG. 7, the antenna 1500 in FIG. 15, or the antenna 1600 in FIG. 16 may ensure the antenna radiation performance by forming resonance at a selected or designated frequency (e.g., about 2.4 GHz).

Figure 18A:
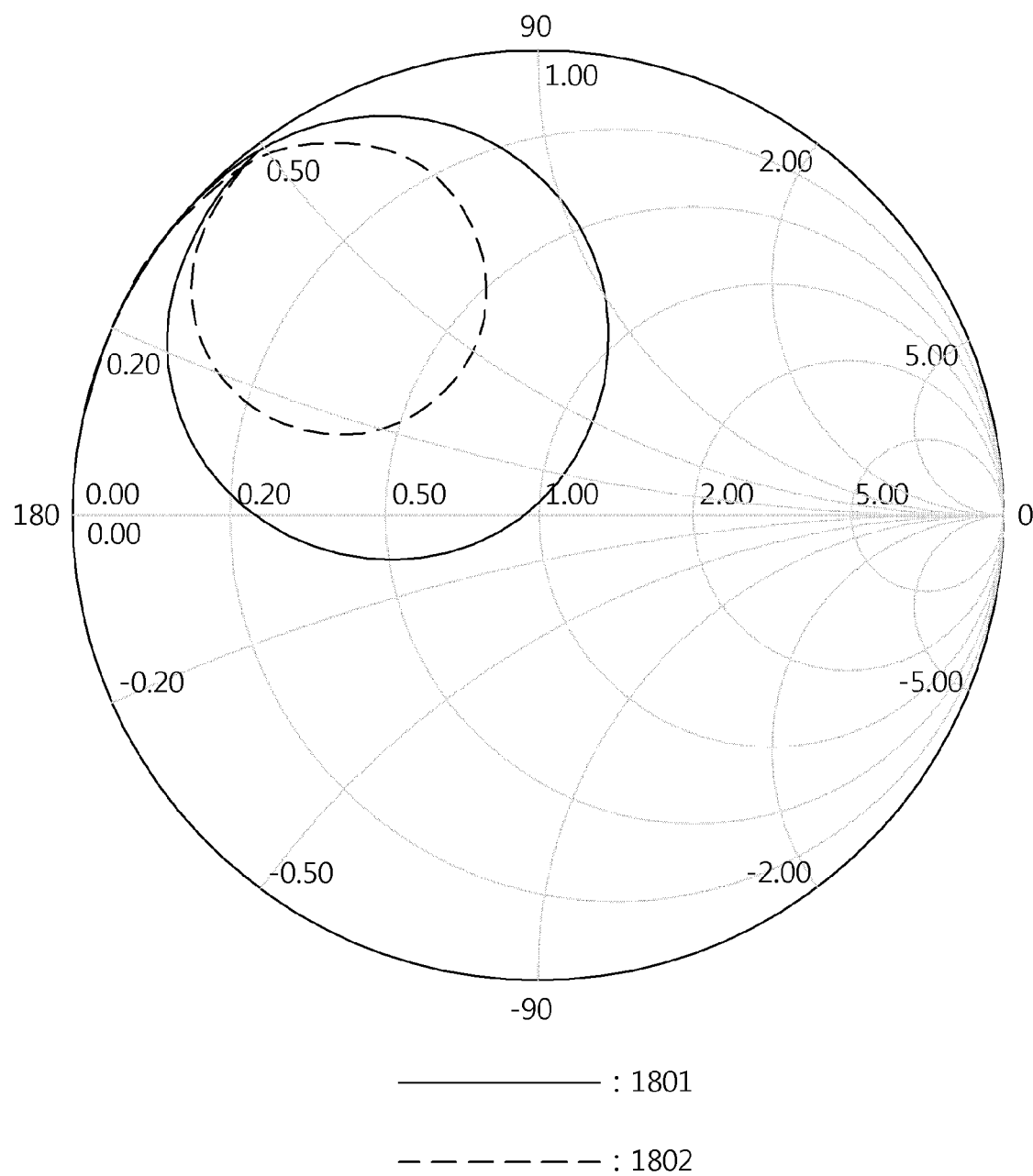
FIG. 18A is a Smith chart related to the antenna in FIG. 7, the antenna in FIG. 12, the antenna in FIG. 13A, the antenna in FIG. 14A, the antenna in FIG. 15, or the antenna in FIG. 16 in the closed state in FIG. 2A or the open state in FIG. 3A according to an embodiment of the disclosure.
Figure 18B:
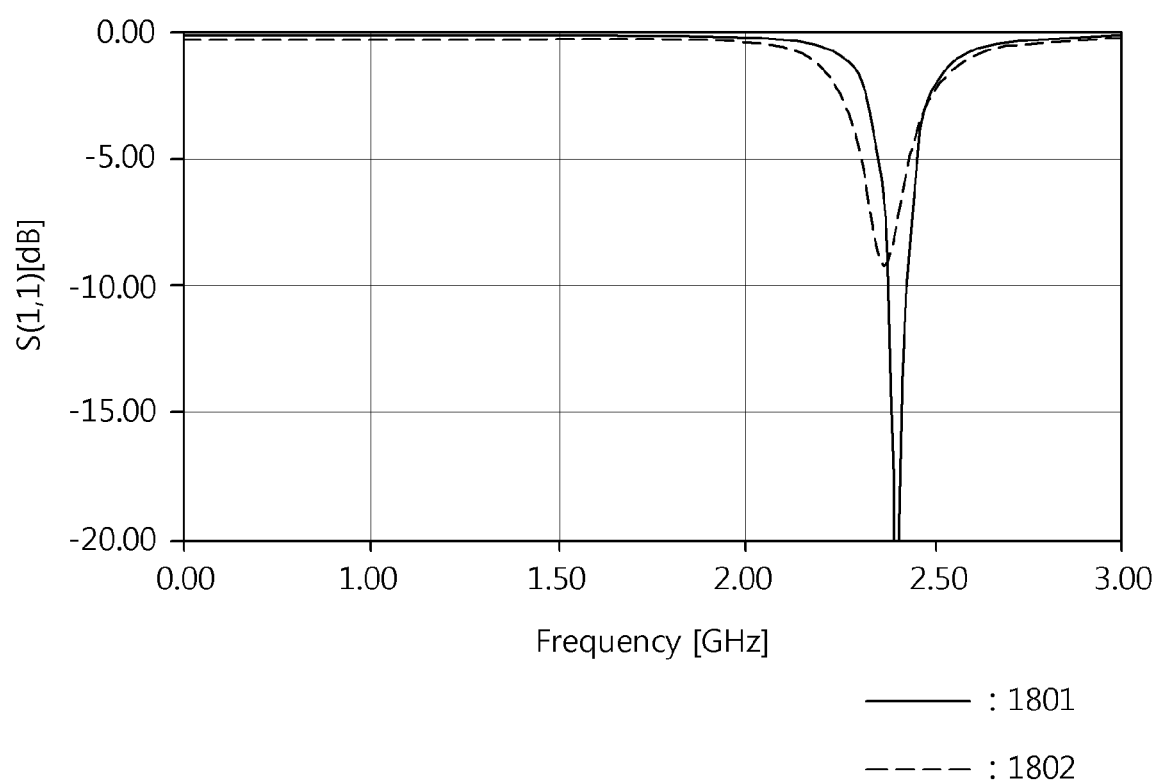
FIG. 18B is a graph illustrating a ratio of an output voltage to an input voltage in a frequency distribution related to the antenna in FIG. 7, the antenna in FIG. 12, the antenna in FIG. 13A, the antenna in FIG. 14A, the antenna in FIG. 15, or the antenna in FIG. 16 in the closed state in FIG. 2A or the open state in FIG. 3A according to an embodiment of the disclosure.

FIG. 18A is a Smith chart related to the antenna in FIG. 7, the antenna in FIG. 12, the antenna in FIG. 13A, the antenna in FIG. 14A, the antenna in FIG. 15, or the antenna in FIG. 16 in a closed state in FIG. 2A or an open state in FIG. 3A according to an embodiment of the disclosure. FIG. 18B is a graph illustrating a ratio of an output voltage to an input voltage in a frequency distribution related to the antenna in FIG. 7, the antenna in FIG. 12, the antenna in FIG. 13A, the antenna in FIG. 14A, the antenna in FIG. 15, or the antenna in FIG. 16 in the closed state in FIG. 2A or the open state in FIG. 3A according to an embodiment of the disclosure.

Referring to FIGS. 18A and 18B, in the embodiment, reference numeral '1801' is related to the closed state (see FIG. 2A) of the electronic device 200, and reference numeral '1802' is related to the open state (see FIG. 3A) of the electronic device 200. Even though the electronic device 200 switches from the closed state to the open state or from the open state to the closed state, the movement of the resonant frequency or the change in impedance may not occur to a degree to which the antenna radiation performance is difficult to ensure.

According to the embodiment of the disclosure, the electronic device (e.g., the electronic device 200 in FIG. 4) may include a housing (e.g., the housing 210 in FIG. 2A) including a first surface (e.g., one surface 410a in FIG. 4) directed in the first direction (e.g., the +z-axis direction in FIG. 4), and a second surface (e.g., the rear surface 210B in FIG. 2B) directed in the second direction (e.g., the -z-axis direction in FIG. 4) opposite to the first surface. The electronic device may include a conductive plate (e.g., the display support structure 220 in FIG. 4) disposed on the first surface of the housing so as to be slidable in the third direction (e.g., the x-axis direction in FIG. 4) perpendicular to the first direction. The display support structure may include the slot (e.g., the slot 710 in FIG. 7). The electronic device may include the flexible display (e.g., the flexible display 230 in FIG. 4) disposed to be supported by the conductive plate. The flexible display may include the first area (e.g., the first area ⓐ in FIG. 4) facing the first surface. The flexible display may include the second area (e.g., the second area ⓑ in FIG. 4) extending from the first area. The second area may be bent in accordance with the sliding motion of the conductive plate. The electronic device may include the wireless communication circuit (e.g., the wireless communication circuit 540 in FIG. 5) configured to transmit and/or receive a signal in a selected or designated frequency band through the antenna (e.g., the sixth antenna radiator ⑥ in FIG. 7, 8, 12, 13A, 13B, 14a, 15, or 16) formed based on at least a part of the conductive plate that surrounds the slot.

According to the embodiment of the disclosure, the slot (e.g., the slot 710 in FIG. 7 or 8) partially overlaps the electromagnetic interference (EMI) blocking conductive sheet (e.g., the EMI blocking conductive sheet 833b in FIG. 8) included in the flexible display when viewed from above the first surface (e.g., one surface 410a in FIG. 4).

According to the embodiment of the disclosure, the slot (e.g., the slot 710 in FIG. 7 or 8) may not overlap the EMI blocking conductive sheet (e.g., the EMI blocking conductive sheet 833b in FIG. 8) included in the flexible display when viewed from above the first surface (e.g., one surface 410a in FIG. 4).

According to the embodiment of the disclosure, the EMI blocking conductive sheet (e.g., the EMI blocking conductive sheet 833b in FIG. 8) may include the opening (not illustrated) that overlaps the slot (e.g., the slot 710 in FIG. 7) when viewed from above the first surface (e.g., one surface 410a in FIG. 4).

According to the embodiment of the disclosure, the electronic device (e.g., the electronic device 200 in FIG. 8) may further include the metal support sheet (e.g., the support sheet 470 in FIG. 8) disposed on the rear surface of the flexible display (e.g., the flexible display 230 in FIG. 8).

According to the embodiment of the disclosure, the slot (e.g., the slot 710 in FIG. 7 or 8) may partially overlap the metal support sheet (e.g., the support sheet 470 in FIG. 8).

According to the embodiment of the disclosure, the slot (e.g., the slot 710 in FIG. 7 or 8) may not overlap the metal support sheet (e.g., the support sheet 470 in FIG. 8) disposed on the rear surface of the flexible display (e.g., the flexible display 230 in FIG. 8).

According to the embodiment of the disclosure, the metal support sheet (e.g., the support sheet 470 in FIG. 8) may include a lattice structure including the plurality of openings formed along the second area ⓑ.

According to the embodiment of the disclosure, the slot (e.g., the slot 710 in FIG. 7) may extend to the edge (e.g., the edge 230e in FIG. 7) of the conductive plate (e.g., the display support structure 220 in FIG. 7).

According to the embodiment of the disclosure, the conductive plate (e.g., the display support structure 220 in FIG. 13A) may surround the entire slot (e.g., the slot 1310 in FIG. 13A).

According to the embodiment of the disclosure, the antenna (e.g., the sixth antenna radiator ⑥ in FIG. 7, 8, 12, 13A, 13B, 14A, 15, or 16) may be electrically connected to the ground (e.g., the ground plane included in the printed circuit board 490 in FIG. 4) positioned in the housing (e.g., the housing 210 in FIG. 2A).

According to the embodiment of the disclosure, the electronic device (e.g., the electronic device 200 in FIG. 2A) may further include the conductive pattern (e.g., the conductive pattern 1520 in FIG. 15 or the conductive pattern 1620 in FIG. 16) disposed in the slot (e.g., the slot 1510 in FIG. 15 or the slot 1610 in FIG. 16) or positioned to at least partially overlap the slot when viewed from above the first surface (e.g., one surface 410a in FIG. 4). The wireless communication circuit (e.g., the wireless communication circuit 540 in FIG. 5) may be electrically connected to the conductive pattern.

According to the embodiment of the disclosure, the antenna (e.g., the sixth antenna radiator ⑥ in FIG. 15 or 16) may be physically separated from the conductive pattern (e.g., the conductive pattern 1520 in FIG. 15 or the conductive pattern 1620 in FIG. 16).

According to the embodiment of the disclosure, the antenna (e.g., the sixth antenna radiator ⑥ in FIG. 16) may be electrically connected to the conductive pattern (e.g., the conductive pattern 1620 in FIG. 16).

According to the embodiment of the disclosure, the conductive plate (e.g., the display support structure 220 in FIG. 8) may include the support portion (e.g., the support portion 2202 in FIG. 8) facing the first area (e.g., the first area ⓐ in FIG. 8). The conductive plate may include the rim portion (e.g., the third rim portion 2201 in FIG. 7) that extends from the support portion, faces one side edge (e.g., the edge 230e in FIG. 7) of the first area, and defines a part of the outer surface of the electronic device. The rim portion may be positioned opposite to the second area (e.g., the second area ⓑ in FIG. 3A) with the first area interposed therebetween when viewed from above the first surface (e.g., one surface 410a in FIG. 4).

According to the embodiment of the disclosure, the slot (e.g., the slot 710 in FIG. 7) may be formed in the support portion (e.g., the support portion 2202 in FIG. 7 or 8) so as to be closer to the rim portion (e.g., the third rim portion 2201 in FIG. 7 or 8) than the second area (e.g., the second area ⓑ in FIG. 3A) when viewed from above the first surface (e.g., one surface 410a in FIG. 4).

According to the embodiment of the disclosure, the support portion (e.g., the support portion 2202 in FIG. 12) may include one side area and the other side area positioned at two opposite sides with the slot (e.g., the slot 1210 in FIG. 12) interposed therebetween. The other side area may be positioned between the slot and the rim portion (e.g., the third rim portion 2201 in FIG. 12) when viewed from above the first surface (e.g., one surface 410*a* in FIG. 4). The electrical path (e.g., the electrical path 1204 in FIG. 12) may electrically connect one side area and the other side area while traversing the slot. The wireless communication circuit (e.g., the wireless communication circuit 540 in FIG. 5) may be electrically connected to one side area (see FIG. 12).

According to the embodiment of the disclosure, the wireless communication circuit (e.g., the wireless communication circuit 540 in FIG. 5) may be electrically connected to the area between the slot (e.g., the slot 1310 in FIG. 13A) and the rim portion (e.g., the third rim portion 2201 in FIG. 13A) (see FIG. 13A).

According to the embodiment of the disclosure, the conductive plate (e.g., the display support structure 220 in FIG. 14A) may further include another slot (e.g., the other slot 1411 in FIG. 14A) extending from the slot (e.g., the slot 1410 in FIG. 14A) and formed in the rim portion (e.g., the third rim portion 2201 in FIG. 14A).

According to the embodiment of the disclosure, the electronic device (e.g., the electronic device 200 in FIG. 2A) may further include the non-conductive member disposed in the slot (e.g., the slot 1410 in FIG. 14A), and the non-conductive member disposed in the other slot (e.g., the other slot 1411 in FIG. 14A).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing comprising:
      a first surface facing toward a first direction, and
      a second surface facing toward a second direction opposite to the first direction;
   a display support structure disposed to be slidable on the first surface of the housing;
   a flexible display comprising:
      a first area disposed on the display support structure, and
      a second area extending from the first area, wherein at least part of the second area is configured to be bent when the display support structure is slid; and
   a wireless communication circuit configured to at least one of transmit or receive a signal in a designated frequency band through an antenna,
   wherein the display support structure comprises a slot overlapping the first area of the flexible display when viewed from above the first surface,
   wherein the antenna is formed by at least a part of the display support structure that surrounds the slot, and
   wherein an electromagnetic interference, EMI, blocking conductive sheet of the flexible display comprises an opening overlapping the slot of the display support structure when viewed from above the first surface.

2. The electronic device of claim 1, further comprising:
   a metal support sheet disposed on a rear surface of the flexible display,
   wherein the slot does not overlap the metal support sheet when viewed from above the first surface.

3. The electronic device of claim 1, wherein the slot extends to an edge of the display support structure.

4. The electronic device of claim 1, wherein the display support structure surrounds the slot entirely.

5. The electronic device of claim 1, wherein the antenna is electrically connected to a ground positioned in the housing.

6. The electronic device of claim 1, further comprising:
   a conductive pattern disposed in the slot or at least partially overlapping the slot when viewed from above the first surface,
   wherein the wireless communication circuit is electrically connected to the conductive pattern.

7. The electronic device of claim 1,
   wherein the display support structure comprises:
      a support portion facing the first area of the flexible display; and
      a rim portion extending from the support portion, facing one side edge of the first area, and configured to form a part of an outer surface of the electronic device, and
   wherein the rim portion is positioned opposite to the second area of the flexible display with the first area interposed therebetween when viewed from above the first surface.

8. The electronic device of claim 7, wherein the slot is formed in the support portion and closer to the rim portion than the second area when viewed from above the first surface.

9. The electronic device of claim 8,
   wherein the support portion comprises a first side area and a second side area positioned at two opposite sides with the slot interposed therebetween,
   wherein the second side area is positioned between the slot and the rim portion when viewed from above the first surface,
   wherein an electrical path electrically connects the first side area to the second side area while traversing the slot, and
   wherein the wireless communication circuit is electrically connected to the first side area.

10. The electronic device of claim 8, wherein the wireless communication circuit is electrically connected to an area between the slot and the rim portion.

11. The electronic device of claim 8, wherein the display support structure further comprises another slot extending from the slot and formed in the rim portion.

* * * * *